United States Patent
Fukatani et al.

(10) Patent No.: US 7,452,608 B2
(45) Date of Patent: Nov. 18, 2008

(54) LAMINATED GLASS AND INTERMEDIATE FILM FOR LAMINATED GLASS

(75) Inventors: Juichi Fukatani, Koka-gun (JP); Toshio Tada, Mishima-gun (JP); Tsuyoshi Hasegawa, Koka-gun (JP); Masaki Matsudo, Koka-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 371 days.

(21) Appl. No.: 10/534,733

(22) PCT Filed: Aug. 19, 2004

(86) PCT No.: PCT/JP2004/011910

§ 371 (c)(1),
(2), (4) Date: May 12, 2005

(87) PCT Pub. No.: WO2005/018969

PCT Pub. Date: Mar. 3, 2005

(65) Prior Publication Data

US 2006/0008658 A1  Jan. 12, 2006

(30) Foreign Application Priority Data

Aug. 22, 2003 (JP) ............... 2003-299375
Oct. 29, 2003 (JP) ............... 2003-369427
Dec. 26, 2003 (JP) ............... 2003-432892
May 14, 2004 (JP) ............... 2004-145471

(51) Int. Cl.
*B32B 17/10* (2006.01)
*B32B 27/42* (2006.01)

(52) U.S. Cl. ............... 428/436; 428/214; 428/220; 428/327; 428/328; 428/339; 428/437; 428/524; 428/525

(58) Field of Classification Search ............... 428/436, 428/437, 214, 220, 327, 328, 339, 524, 525
See application file for complete search history.

(56) References Cited

U.S. PATENT DOCUMENTS

| | | | |
|---|---|---|---|
| 5,482,767 A * | 1/1996 | Karagiannis et al. | 428/327 |
| 2003/0006704 A1 | 1/2003 | Morimoto et al. | |
| 2003/0139520 A1 | 7/2003 | Toyama et al. | |

FOREIGN PATENT DOCUMENTS

| | | |
|---|---|---|
| CN | 1386629 A | 12/2002 |
| JP | 6-340029 A | 12/1994 |
| JP | 2001-316140 A | 11/2001 |
| JP | 2003-48763 A | 2/2003 |
| JP | 2003-146710 A | 5/2003 |
| JP | 2003-176159 A | 6/2003 |

* cited by examiner

*Primary Examiner*—D. S Nakarani
(74) *Attorney, Agent, or Firm*—Sughrue Mion, PLLC

(57) ABSTRACT

It is an object of the present invention to provide a laminated glass and an interlayer film for laminated glasses, which have the high performance for mitigating the impact given externally and, particularly in the case of using it as glass for vehicles, have the high performance for mitigating the impact when head comes into collision with the glass due to the occurrence of a personal accident.

The present invention is directed to a laminated glass, wherein at least an interlayer film for laminated glasses and a glass sheet are laminated and unified, Head Injury Criteria (HIC) values, measured according to regulations of European Enhanced Vehicle-safety Committee; EEVC/WG 17, being 1,000 or lower.

73 Claims, 8 Drawing Sheets

Example 4

LAMINATED GLASS AND INTERMEDIATE FILM FOR LAMINATED GLASS

TECHNICAL FIELD

The present invention relates to a laminated glass and an interlayer film for laminated glasses, which have the high performance for mitigating the impact given externally and, particularly in the case of using it as glass for vehicles, have the high performance for mitigating the impact when head comes into collision with the glass due to the occurrence of a personal accident.

BACKGROUND ART

In recent years, there have been studied and developed systems for evaluating automobile's performance to protect pedestrians when the vehicle comes into collision with a pedestrian in advanced countries. Head portion is largest in number among body parts on which pedestrians are vitally injured in collision with an automobile. Therefore, also on a method of a head impact test for evaluating the protections of head from impact, international standards (ISO/SC 10/WG 2) and EU standards (EEVC/WG 10,ECE-Regulation No. 43 Annex 3) are defined.

For example, European Enhanced Vehicle-safety Committee; EEVC/WG 17 has proposed a test for the protections of head as a part of a test for the protections of pedestrian and has proposed a condition that a Head Injury Criteria (HIC) value, which is determined by a method according to this test for the protections of head, does not exceed 1,000 as a performance standard on automobile's safety. Further, an HIC value of 1,000 is a threshold of being seriously injured, and it is said that when the HIC value is higher than 1,000, a probability of survival of a normal human being becomes lower.

Front noses of recent automobiles have tendencies to be shortened and in the recent accidents, a location of vehicles with which the head of an adult pedestrian comes into collision is often a windshield other than a hood.

But, since the test for the protections of head of EEVC/WG 17 limits the scope of test to on the hood of the passenger cars by its definition, in the ongoing International Harmonized Research Activities (IHRA), it is considered to include the windshield in the scope of the test for the protections of adult head.

Currently, as the glass for vehicles such as automobiles, aircrafts, buildings and the like, laminated glasses are widely employed because less fragments of broken glass shatter even though the laminated glass is impacted externally and broken and therefore the laminated glass is safe. As such a laminated glass, there is given a laminated glass obtained by interposing an interlayer film for laminated glasses, which comprises polyvinyl acetal resin such as polyvinyl butyral resin plasticized with a plasticizer, between at least a pair of glass sheets and unifying them and the like.

However, many of conventional laminated glasses have the HIC value of higher than 1,000. Especially in windshields of automobiles, the HIC value is particularly high in the vicinity of a periphery of the windshield secured to the window's frame and some laminated glasses have an HIC value of higher than 2,000. Such the vicinity of the periphery of the windshield is a location with which the head of an adult pedestrian comes into collision at a high probability in the occurrence of an accident, and a laminated glass having a lower HIC value has been required in order to avoid damages to head in the collision of pedestrian with vehicles.

DISCLOSURE OF THE INVENTION

Problems which the Invention is to Solve

In view of the above-mentioned state of the art, it is an object of the present invention to provide a laminated glass and an interlayer film for laminated glasses, which have the high performance for mitigating the impact given externally and, particularly in the case of using it as glass for vehicles, have the high performance for mitigating the impact when head comes into collision with the glass due to the occurrence of a personal accident.

Means for Solving the Object

The present invention is directed to a laminated glass, wherein at least an interlayer film for laminated glasses and a glass sheet are laminated and unified, Head Injury Criteria (HIC) values, measured according to regulations of European Enhanced Vehicle-safety Committee; EEVC/WG 17 (hereinafter, also referred to as an HIC value (EEVC)), being 1,000 or lower.

The present invention is directed to a laminated glass, wherein at least an interlayer film for laminated glasses and a glass sheet are laminated and unified, Head Injury Criteria (HIC) values, measured according to regulations of Economic Commission for Europe; ECE-Regulation No. 43 Annex 3 except for dropping an impactor head from a height of 4 m above the surface of the laminated glass (hereinafter, also referred to as HIC value (ECE)), being 300 or lower.

Incidentally, when the Head Injury Criteria (HIC) value is described as only an HIC value in this description, it represents any of an HIC value (EEVC) and an HIC value (ECE).

Hereinafter, the present invention will be described in detail.

The laminated glass of the present invention has an HIC value (EEVC), measured according to the regulations of EEVC/WG 17, of 1,000 or lower. If the HIC value is higher than 1,000, in the case of using the laminated glass of the present invention as glass for vehicles, it is impossible to avoid damages to head in the collision of pedestrian with vehicles and this causes a probability of survival to decrease. The HIC value is preferably 600 or lower and more preferably 300 or lower.

In the laminated glass of the present invention, the HIC value (EEVC) is measured by colliding an impactor head at a speed of 11.1 m/s to a central portion of a laminated glass when the laminated glass having a size of 600 mm×600 mm is secured to a frame having an opening of 500 mm×500 mm.

FIG. 1 is an exploded perspective view showing schematically a sample of an HIC value measuring apparatus used in measuring HIC values (EEVC) of the laminated glass of the present invention.

As shown in FIG. 1, the HIC value measuring apparatus 10 is mainly composed of a supporting portion 11 in the form of box, provided with a flange portion 12 on which a peripheral portion of a laminated glass is rested at the top end, a securing portion 13 having the approximately same shape as the flange portion 12 and an impactor head 14 having a configuration imitating a human head.

The flange portion 12 of the supporting portion 11 and the securing portion 13 are provided with a plurality of through holes (not shown) at the corresponding positions, respectively, and after the laminated glass of which the HIC value is measure is rested on the flange portion 12 and the securing portion 13 is placed on the laminated glass at specified positions, fastening members such as a screw are screwed into the through holes, and thereby the laminated glass can be held and secured at its peripheral portion.

That is, in the HIC value measuring apparatus shown in FIG. 1, an inner radius of the flange portion 12 and the securing portion 13 has a size of 500 mm×500 mm.

In the impactor head 14, a hemispherical resin head skin is attached to a metal core and an acceleration sensor to measure an acceleration in a triaxial direction is provided at the center within the above core.

Such an impactor head 14 is located above the laminated glass held and secured as described above, and the above-mentioned acceleration sensor senses an impact at the moment when colliding the impactor head to the surface of the laminated glass under the conditions described above to measure an HIC value of the laminated glass.

The HIC value (EECV) can be determined by the following equation (1) according to the regulations of EEVC/WG 17 after arranging the apparatus at specified position as described above.

(equation 1)

$$HIC = \left[\frac{1}{(t_2 - t_1)} \int_1^2 a_r dt\right]^{2.5} (t_2 - t_1)_{max} \quad (1)$$

but $a_r = \sqrt{a_I^2 + a_F^2 + a_S^2}$

In the equation (1), $a_r$ represents a synthesized acceleration (G) of the impactor head, $a_I$ represents an acceleration (G) in the direction of travel of the impactor head, $a_F$ represents an forward and backward acceleration (G) of the impactor head, as represents a lateral acceleration (G) of the impactor head, and $t_2$-$t_1$ represents a time span (maximum 0.015 seconds) at which the HIC value is maximized.

In the laminated glass of the present invention, the HIC value (ECE), measured by dropping an impactor head from a height of 4 m above the surface of the laminated glass according to regulations of ECE-Regulation No. 43 Annex 3, is 300 or lower. By reducing the HIC value (ECE) below 300, it becomes possible to reduce HIC value also in a periphery of the windshield secured to the window's frame and it is possible to avoid the damages to head in the collision of pedestrian with vehicles and a probability of survival becomes higher. The HIC value is preferably 250 or lower.

In the laminated glass of the present invention, the HIC value (ECE) is measured by colliding an impactor head at dropping height of 4 m to a central portion of a laminated glass when the laminated glass having a size of 1,100 mm×500 mm is secured to a frame having an opening of 1,070 mm×470 mm. In this time, a collision speed of the impactor head is 8.9 m/s.

FIG. 2 is a view showing schematically a sample of an HIC value measuring apparatus used in measuring HIC values (ECE) of the laminated glass of the present invention.

As shown in FIG. 2, the HIC value measuring apparatus is composed of a laminated glass stage 21 having a structure similar to that in HIC values (EECV) described above, an impactor head 22 having a configuration imitating a human head and a guide system 23 to drop the impactor head vertically.

The constitution of the impactor head is described in detail in regulations of ECE-Regulation No. 43 Annex 3, and for example, metal plates are attached to a top and a bottom of a wood constituent body, respectively, and a hemisphere made from polyamide resin is attached as shown in Figure to assemble a pear-like head. An acceleration sensor to measure an acceleration in a triaxial direction is equipped on a base plate and a rubber head skin is attached to the hemisphere made from polyamide resin which is located at the bottom. A weight of the impactor head is 10 kg.

The guide system 23 includes a mechanism to carry/detach an impactor head 22 and it is dropped with the mechanism carrying the impactor head 22 from a specified height (4 m in the present invention). A state of a fall in doing so is observed with an optical sensor 24 and the impactor head 22 is detached from the guide system 23 at the moment when the impactor head 22 passes by a position of the optical sensor. The impactor head detached from the guide system 23 falls freely and comes into collision with a central portion of a laminated glass secured to the support 21 of a laminated glass. An impact in this time is sensed by the above-mentioned acceleration sensor to measure an HIC value (ECE) of the laminated glass.

The HIC value (ECE) can be determined by the above-mentioned equation (1) as with the HIC value (EECV).

Both the HIC value (EECV) and the HIC value (ECE) are standards defined by European official agencies. The HIC value (EECV) and the HIC value (ECE) are different from each other in a measuring method and criteria, and it is difficult to make a direct comparison between them. However, generally, it can be said that the HIC value (ECE) is 300 or lower is more tough than that the HIC value (EEVC) is 1,000 or lower as a standard. Accordingly, there may be cases where even though a laminated glass can achieve the HIC value (EEVC) of 1,000 or lower, it cannot achieve the HIC value (ECE) of 300 or lower. Though the laminated glass of the present invention includes both a substance of the HIC value (EEVC) of 1,000 or lower and a substance of the HIC value (ECE) of 300 or lower, it is preferred that the HIC value (ECE) is 300 or lower.

A laminated glass which can achieve such a low HIC value is not particularly limited and includes (1) a laminated glass to absorb an impact with a interlayer film for laminated glasses, (2) a laminated glass to absorb an impact by reducing a thickness of a glass portion to readily deform or shatter in collision, and (3) a laminated glass in which by replacing glass on one side (inner side in using the laminated glass as glass for vehicles) of a laminated glass with a resin plate, impact-absorbency of the overall laminated glass is enhanced.

Hereinafter, respective cases will be described in detail.

First, (1) the case of absorbing an impact with the interlayer film for laminated glasses will be described.

An interlayer film for laminated glasses used in this case is not particularly limited but an interlayer film for laminated glasses, in which a plasticizer for interlayer films is contained in an amount 30 parts by weight or more per 100 parts by weight of polyvinyl acetal resin, is suitably used. It is possible to reduce the HIC value of the laminated glass by using the interlayer film for laminated glasses, in which such a large amount of plasticizer for interlayer films is blended. An amount of the plasticizer for interlayer films to be blended is more preferably 40 parts by weight or more, furthermore preferably 45 parts by weight or more, and particularly preferably 60 parts by weight or more. When the above-mentioned interlayer film for laminated glasses has a multilayer structure of two-layers or more, the HIC value of the laminated glass can be reduced by having a resin layer of the above-mentioned constitution in at least one layer.

The above-mentioned polyvinyl acetal resin is not particularly limited but polyvinyl acetal resin having an acetalization degree of 60 to 85 mol % is suitable. The acetalization degree is more preferably 65 to 80 mol %.

Incidentally, in this description, the "acetalization degree" refers to an acetalization degree derived by a method of counting two acetalized hydroxyl groups since an acetal group of polyvinyl acetal resin is formed by acetalizing two hydroxyl groups of poly alcohol resin to be a raw material.

As the above-mentioned polyvinyl acetal resin, polyvinyl acetal resin, in which a half band width of a peak of a hydroxyl group, obtained in measuring infrared absorption spectra, is 250 $cm^{-1}$ or less, is suitable. The half band width is more preferably 200 $cm^{-1}$ or less.

Here, as a method of measuring the infrared absorption spectrum of the above-mentioned interlayer film for laminated glasses, there is given a method of using, for example, "FT-IR" manufactured by HORIBA, Ltd. to measure the infrared absorption spectrum and the half band width can be determined from a peak, corresponding to a hydroxyl group, of the obtained peaks.

As a method of producing the above-mentioned polyvinyl acetal resin, there are given, for example, a method of dissolving polyvinyl alcohol in hot water, adding an acid catalyst and aldehyde to the obtained aqueous solution of polyvinyl alcohol while keeping the aqueous solution at 0 to 90° C., preferably 10 to 20° C., allowing an acetalization reaction to proceed while stirring, raising a reaction temperature to 70° C. to age the reactant and complete the reaction, and then conducting neutralization, water washing and drying to obtain powder of polyvinyl acetal resin.

The above-mentioned aldehyde is not limited and includes, for example, aliphatic aldehydes, aromatic aldehydes and alicyclic aldehydes such as propionaldehyde, n-butylaldehyde, iso-butylaldehyde, valeraldehyde, n-hexyl aldehyde, 2-ethylbutyl aldehyde, n-heptyl aldehyde, n-octylaldehyde, n-nonyl aldehyde, n-decyl aldehyde, benzaldehyde, cinnamaldehyde. The above-mentioned aldehyde is preferably n-butylaldehyde, n-hexyl aldehyde, 2-ethylbutyl aldehyde and n-octyl aldehyde, having 4 to 8 carbon atoms. N-butylaldehyde having 4 carbon atoms is more preferred since weathering resistance is excellent through use of polyvinyl acetal resin to be obtained and in addition the production of resin becomes easy. These aldehydes may be used alone or in combination of two or more species.

The above-mentioned polyvinyl acetal resin may be crosslinked one. By using crosslinked polyvinyl acetal resin, the bleed-out of a plasticizer for interlayer films can be inhibited.

As a method of crosslinking the above-mentioned polyvinyl acetal resin, there are given, for example, a method of partially crosslinking between molecules with a diacetal bond using dialdehyde such as glutaraldehyde in acetalizing polyvinyl alcohol by aldehyde such as butyl aldehyde; a method in which in an acetalization reaction of polyvinyl alcohol, after reaching at least 90% of intended acetalization degree, an acid catalyst is added to this reactant and the mixture is reacted at 60 to 95° C., and thereby, crosslinking is formed between molecules of polyvinyl acetal with a monobutyral bond; a method of adding a crosslinking agent which is reactive with a hydroxyl group remaining in an obtained polyvinyl acetal resin to cross-link the hydroxyl group; and a method of cross-linking a hydroxyl group remaining in polyvinyl acetal resin by diisocyanate and polyhydric epoxy.

As the above-mentioned crosslinking agent which reacts with a hydroxyl group, there are given, for example, dialdehydes such as glyoxal, dialdehydes containing a sulfur atom in a molecular chain, glyoxal-ethylene glycol reactant, polyvinyl alcohol modified with aldehyde at both ends, dialdehyde starch, polyacrolein; methylols such as N-methylolurea, N-methylolmelamine, trimethylolmelamine, hexamethylolmelamine; epoxys such as α-hydroxyethylsulfonic acid, epichlorohydrin, polyethyleneglycol diglycidyl ether, diglycidyl etherified bisphenol A type epoxy resin, polypropylene glycol diglycidyl ether, neopentyl glycol diglycidyl ether, diglycidyl etherified glycerin, polyethylene glycol having three or more glycidyl ether groups in a molecular chain, polyglycidyl ether modification product of trimethylolpropane, polyglycidyl ether modification product of sorbitol, polyglycidyl ether modification product of sorbitan, polyglycidyl ether modification product of polyglycerol; polyhydric carboxylic acids such as dicarboxylic acid, Michael adduct of triethylene glycol and methyl acrylate, polyacrylic acid, mixture of methyl vinyl ether-maleic acid copolymer and isobutylene-maleic anhydride copolymer; aromatic diisocyanates such as trilene diisocyanate, phenylene diisocyanate, 4,4'-diphenylmethane diisocyanate, 1,5-naphthylene diisocyanate; aliphatic diisocyanates such as hexamethylene diisocyanate, xylylene diisocyanate, ridine diisocyanate, 4,4'-dicyclohexylmethane diisocyanate, isophorone diisocyanate; and polyisocyanate blocked with polyphenol, acetyl acetone, diethyl malonate, lactam, oxime, amide or tertiary alcohol etc.

When the above-mentioned interlayer film for laminated glasses comprises crosslinked polyvinyl acetal resin, the above-mentioned interlayer film for laminated glasses preferably has a thickness of 800 µm or more. When the thickness is less than 800 µm, low HIC value may not be adequately attained.

The above-mentioned plasticizer for interlayer films is not particularly limited as long as it is one generally used in polyvinyl acetal resin and publicly known plasticizers which are generally used as a plasticizer for interlayer films can be used. As such a plasticizer for interlayer films, there are given, for example, organic ester type plasticizers such as monobasic acid ester, polybasic acid ester; and phosphoric acid type plasticizers such as organic phosphoric acid type, organic phosphorous acid type. These plasticizers may be used alone or may be used in combination of two or more species and are selectively used depending on the species of the polyvinyl acetal resin in consideration of the compatibility with resins.

The above-mentioned monobasic acid ester type plasticizer is not particularly limited and includes, for example, glycol type esters obtained by a reaction between glycol such as triethylene glycol, tetraethylene glycol or tripropylene glycol and organic acid such as butyric acid, isobutyric acid, capric acid, 2-ethylbutyric acid, heptylic acid, n-oxtylic acid, 2-ethylhexyl acid, pelargonic acid (n-nonylic acid) or decylic acid. Among others, there are suitably used monobasic organic acid esters of triethylene glycol such as triethylene glycol-dicapric acid ester, triethylene glycol-di-2-ethylbutyric acid ester, triethylene glycol-di-n-octylic acid ester, triethylene glycol-di-2-ethylhexyl acid ester.

The above-mentioned polybasic acid ester type plasticizer is not particularly limited and includes, for example, ester of polybasic organic acid such as adipic acid, sebacic acid or azelaic acid and straight-chain or branched alcohol having 4 to 8 carbon atoms. Among others, dibutyl sebacare, dioctyl azelate, dibutyl carbitol adipate are suitably used.

The above-mentioned organic ester type plasticizer is not particularly limited but for example, triethylene glycol di-2-ethylbutyrate, triethylene glycol di-2-ethylhexoate, triethylene glycol dicaprate, triethylene glycol di-n-2-octoate, triethylene glycol di-n-heptoate, tetraethylene glycol di-n-heptoate, dibutyl sebacare, dioctyl azelate and dibutyl carbitol adipate are suitably used.

As the above-mentioned plasticizer, in addition to these, there also can be used, for example, ethylene glycol di-2-ethylbutyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylenebutyrate, diethylene glycol di-2-ethylbutyrate, diethylene glycol di-2-ethylhexoate, dipropylene glycol di-2-ethylbutyrate, triethylene glycol di-2-ethylpentoate, tetraethylene glycol di-2-ethylbutyrate and diethylene glycol dicapriate.

The above-mentioned phosphoric acid type plasticizer is not particularly limited but for example, tributoxyethyl phosphate, isodecylphenyl phosphate and triisopropyl phosphite are suitable.

Among these plasticizer for interlayer films, there are particularly suitably used diester type compounds comprising dicarboxylic acid and monohydric alcohol or comprising monocarboxylic acid and dihydric alcohol.

And, as the above-mentioned interlayer film for laminated glasses, a interlayer in which rubber particles are dispersed is suitable. When such rubber particles are dispersed, it is possible to absorb an impact as force is applied to the interlayer film for laminated glasses.

The above-mentioned rubber particle is not particularly limited but for example, a crosslinked resin of polyvinyl acetal is suitable from the fact that it has a refractive index close to that of surrounding resin and it hardly causes deterioration of the visible transmittance of an interlayer film for laminated glasses to be obtained from the crosslinked resin of polyvinyl acetal. A particle size of the above-mentioned rubber particle is not particularly limited but it is preferably 1.0 μm or smaller, and an amount of the above-mentioned rubber particles to be blended is not particularly limited but a preferable lower limit is 0.01 parts by weight and a preferable upper limit is 10 parts by weight with respect to 100 parts by weight of resin such as polyvinyl acetal resin.

As the above-mentioned interlayer film for laminated glasses, there are suitably used an interlayer film in which a storage elasticity modulus G' in a linear dynamic viscoelasticity test, which is measured with frequencies varied by a shear method at 20° C. in a range of frequencies of $5.0 \times 10^1$ to $1.0 \times 10^2$ Hz, is $3 \times 10^7$ Pa or lower; an interlayer film in which tan δ of at least one point is 0.6 or more at 20° C. in a range of frequencies of $5.0 \times 10^1$ to $1.0 \times 10^2$ Hz; and an interlayer film in which maximum stress σ, which is derived from a stress-deformation curve at 20° C. and a tensile speed of 500%/min, is 20 MPa or smaller and fracture point deformation ε derived similarly of 200% or more.

The above-mentioned storage elasticity modulus G' is a value representing softness of the interlayer film for laminated glasses. By using an adequately soft interlayer film for laminated glasses, a laminated glass to be obtained becomes low in the HIC value. When the storage elasticity modulus G' exceeds $3.0 \times 10^7$ Pa, the HIC value (EEVC) of the laminated glass to be obtained may exceed 1,000 or the HIC value (ECE) may exceed 300. The storage elasticity modulus G' is more preferably $1.0 \times 10^7$ Pa or lower and furthermore preferably $5.0 \times 10^6$ Pa or lower.

And, in the above-mentioned interlayer film for laminated glasses, it is preferred that a storage elasticity modulus E' in a viscoelasticity test, which is measured with frequencies varied by a tensile method at 20° C. in a range of frequencies of $5.0 \times 10^1$ to $1.0 \times 10^2$ Hz, is $1.0 \times 10^9$ Pa or lower. The above-mentioned storage elasticity modulus E' is also a value representing softness of the interlayer film for laminated glasses. By using an adequately soft interlayer film for laminated glasses, a laminated glass to be obtained becomes low in the HIC value. When the storage elasticity modulus E' exceeds $1.0 \times 10^9$ Pa, the HIC value (EEVC) of the laminated glass to be obtained may exceed 1,000 or the HIC value (ECE) may exceed 300. The storage elasticity modulus E' is more preferably $0.5 \times 10^9$ Pa or lower and furthermore preferably $5.0 \times 10^6$ Pa or lower.

The above-mentioned tan δ is a ratio between a storage elasticity modulus G' measured with frequencies varied by a shear method and a loss modulus G" (G"/G') and a value showing dynamic viscoelasticity of the interlayer film for laminated glasses, and by extension the absorbency of impact energy. By using an interlayer film for laminated glasses having an adequately high absorbency of impact energy, a laminated glass to be obtained becomes low in the HIC value. When the tan δ is less than 0.6, the HIC value (EEVC) of the laminated glass to be obtained may exceed 1,000 or the HIC value (ECE) may exceed 300. The tan δ is more preferably 0.7 or more.

Further, a measuring frequency of the above-mentioned storage elasticity modulus G', storage elasticity modulus E' and tan δ is within a range of $5.0 \times 10^1$ to $1.0 \times 10^2$ Hz, and this represents deformation of 10 to 20 msec and measuring result of a region including a maximum time span, 15 msec, of the HIC value measurement. In the measurement of the HIC value, deformation in a short time span of shorter than 10 msec may become predominant to measurement, but it is possible to analogize easily from measuments in $5.0 \times 10^1$ to $1.0 \times 10^2$ Hz up to the order of $1.0 \times 10^2$ to $3.0 \times 10^2$ Hz (represent 3.3 to 10 msec). Therefore, since measurements of the storage elasticity modulus G', storage elasticity modulus E' and tan δ in a range of a frequency of $5.0 \times 10^1$ to $1.0 \times 10^2$ Hz satisfy the above-mentioned conditions, it is thought that the HIC value can be adequately reduced.

When the above-mentioned maximum stress σ and fracture point deformation ε remain in the range described above, the interlayer film for laminated glasses can absorb impact energy by stretching within 15 msec in collision and a laminated glass using such an interlayer film for laminated glasses becomes low in the HIC value. The above-mentioned maximum stress σ is more preferably 18 MPa or smaller and furthermore preferably 16 MPa or smaller. The above-mentioned fracture point deformation ε is more preferably 300% or more and furthermore preferably 400% or more.

In addition, a stress-deformation curve of the above-mentioned interlayer film for laminated glasses can be drawn, for example, by stretching a specimen of the interlayer film for laminated glasses at 20° C. and a tensile speed of 500%/min with a dumbbell No. 1 using a tension tester according to JIS K 6771 to measure resistance (kg/cm$^2$). And, the above-mentioned maximum stress σ is a maximum value of the above-mentioned resistance and the above-mentioned fracture point deformation ε is a value of the deformation shown at the time of fracture of the above-mentioned specimen.

When the maximum stress a and the fracture point deformation ε, thus derived, satisfy the above-mentioned conditions, breaking energy U of the above-mentioned interlayer film for laminated glasses is preferably 1.0 J/mm$^2$ or larger. Here, the breaking energy U can be derived from the stress σ and the deformation ε of the interlayer film for laminated glasses in a tensile test under the above-mentioned conditions using the following equation (2).

$$U = \int \sigma d\epsilon \qquad (2)$$

The above-mentioned interlayer film for laminated glasses may be composed of only a layer comprising resin composition in which a plasticizer for interlayer films is contained in an amount 30 parts by weight or more per 100 parts by weight of the polyvinyl acetal resin described above but preferably it has a multilayer structure including such a layer.

When the interlayer film for laminated glasses is composed of only a layer comprising resin composition in which a plasticizer for interlayer films is contained in an amount 30 parts by weight or more per 100 parts by weight of the polyvinyl acetal resin, there may be cases where it is low in basic various performance required as glass for vehicles, such as resistance to penetrating through glass, although it can reduce the HIC value. For example, in the laminated glass of the present invention, an impactor dropping height measured by an impactor dropping height test is preferably 4 m or higher. When this height is less than 4 m, the resistance to penetrating through glass of the overall laminated glass becomes insufficient and the laminated glass may not be employed as glass for vehicles. This height is more preferably 5 m or higher and furthermore preferably 7 m or higher.

By employing the multilayer structure, the HIC value is reduced through a layer comprising resin composition in which a plasticizer for interlayer films is contained in an amount 30 parts by weight or more per 100 parts by weight of the polyvinyl acetal resin and simultaneously the performance such as resistance to penetrating through glass is added through another layers, and therefore one of different functions is compatible with another.

The interlayer film for laminated glasses having the multilayer structure is not particularly limited but a preferable constitution will be described in detail by the following descriptions.

When the interlayer film for laminated glasses has a two-layers structure, it is preferred that a storage elasticity modulus G' at 20° C. and a frequency of $5.0 \times 10^1$ to $1.0 \times 10^2$ Hz in one layer is at or below a half of a storage elasticity modulus G' at 20° C. and a frequency of $5.0 \times 10^1$ to $1.0 \times 10^2$ Hz in the other layer. In this time, it is more preferred that a storage elasticity modulus G' at 20° C. and a frequency of $5.0 \times 10^1$ to $1.0 \times 10^2$ Hz in one layer is $2 \times 10^6$ Pa or lower and a storage elasticity modulus G' at 20° C. and a frequency of $5.0 \times 10^1$ to $1.0 \times 10^2$ Hz in the other layer is $1 \times 10^7$ Pa or higher, and it is furthermore preferred that the above-mentioned layer, in which the storage elasticity modulus G' at 20° C. and a frequency of $5.0 \times 10^1$ to $1.0 \times 10^2$ Hz is $2 \times 10^6$ Pa or lower, has tan δ of 0.7 or more at 20° C. and a frequency of $5.0 \times 10^1$ to $1.0 \times 10^2$ Hz.

And, in such an interlayer film for laminated glasses, it is preferred that a thickness of the above-mentioned layer, in which the storage elasticity modulus G' is $2 \times 10^6$ Pa or lower, is 10% or higher of a total thickness of the interlayer film for laminated glasses. When this thickness of the above-mentioned layer is lower than 10% of the total thickness of the interlayer film for laminated glasses, it may be impossible to realize a low HIC value. It is more preferably 14% or higher and furthermore preferably 20% or higher.

When the interlayer film for laminated glasses having such a two-layers structure is employed, the low HIC value is compatible with the resistance to penetrating through glass.

When the interlayer film for laminated glasses has a three-layers structure, it is preferred that a storage elasticity modulus G' at 20° C. and a frequency of $5.0 \times 10^1$ to $1.0 \times 10^2$ Hz in an intermediate layer is at or below a half of a storage elasticity modulus G' at 20° C. and a frequency of $5.0 \times 10^1$ to $1.0 \times 10^2$ Hz in one or any of two layers composing the outermost layer. In this time, it is more preferred that a storage elasticity modulus G' at 20° C. and a frequency of $5.0 \times 10^1$ to $1.0 \times 10^2$ Hz in the intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher, and it is furthermore preferred that the intermediate layer has tan δ of 0.7 or more at 20° C. and a frequency of $5.0 \times 10^1$ to $1.0 \times 10^2$ Hz.

In addition, it is preferred that a storage elasticity modulus G' of the above-mentioned intermediate layer is at or below a half of a storage elasticity modulus G' of one of two layers composing the outermost layer, and it is more preferred that it is at or below a half of a storage elasticity modulus G' of any of two layers composing the outermost layer.

And, in such an interlayer film for laminated glasses, it is preferred that a thickness of the above-mentioned intermediate layer is 10% or higher of a total thickness of the interlayer film for laminated glasses. When this thickness is lower than 10% of the total thickness of the interlayer film for laminated glasses, it may be impossible to realize a low HIC value. It is more preferably 14% or higher and furthermore preferably 20% or higher.

When the interlayer film for-laminated glasses having such a three-layers structure is employed, the low HIC value is compatible with the resistance to penetrating through glass, and further it is possible to develop the performance such as resistance to blocking between the interlayer films for laminated glasses.

When the interlayer film for laminated glasses has a multilayer structure of four-layers or more, it is preferred that a storage elasticity modulus G' at 20° C. and a frequency of $5.0 \times 10^1$ to $1.0 \times 10^2$ Hz in at least one layer of an intermediate layer is at or below a half of a storage elasticity modulus G' at 20° C. and a frequency of $5.0 \times 10^1$ to $1.0 \times 10^2$ Hz in one or any of two layers composing the outermost layer. In this time, it is more preferred that a storage elasticity modulus G' at 20° C. and a frequency of $5.0 \times 10^1$ to $1.0 \times 10^2$ Hz in the above-mentioned intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher, and it is furthermore preferred that tan δ of the intermediate layer, in which the storage elasticity modulus G' is $2 \times 10^6$ Pa or lower, at 20° C. and a frequency of $5.0 \times 10^1$ to $1.0 \times 10^2$ Hz is 0.7 or more.

In addition, it is preferred that a storage elasticity modulus G' of the above-mentioned at least one layer of the intermediate layer is at or below a half of a storage elasticity modulus G' of one of two layers composing the outermost layer, and it is more preferred that it is at or below a half of a storage elasticity modulus G' of any of two layers composing the outermost layer.

And, in such an interlayer film for laminated glasses, it is preferred that a thickness of the above-mentioned intermediate layer, in which the storage elasticity modulus G' is $2 \times 10^6$ Pa or lower, is 10% or higher of a total thickness of the interlayer film for laminated glasses. When this thickness is lower than 10% of the total thickness of the interlayer film for laminated glasses, it may be impossible to realize a low HIC value. It is more preferably 14% or higher and furthermore preferably 20% or higher.

In the case where the above-mentioned interlayer film for laminated glasses has a multilayer structure of three-layers and four-layers or more, it is preferred that the intermediate layer, having the storage elasticity modulus G' of $2 \times 10^6$ Pa or lower, is biased to the side of either surface layer with respect to the thickness direction of the interlayer film for laminated glasses. When the laminated glass of such a interlayer film for laminated glasses is attached to vehicles and the like in such a way, that the side of the interlayer, to which the intermediate layer having the storage elasticity modulus G' of $2 \times 10^6$ Pa or lower is biased, faces outside the vehicles, the HIC value can be reduced in this direction.

As a method of biasing the intermediate layer having the storage elasticity modulus G' of $2\times10^6$ Pa or lower to the side of either surface layer like this, there are given, for example, a method of increasing a thickness of one outermost layer 1.2 or more times larger than that of the other outermost layer, more preferably 1.5 or more times and furthermore preferably 2.0 or more times and the like.

When the interlayer films for laminated glasses having such a multilayer structure of three-layers and four-layers or more are employed, the low HIC value is compatible with the resistance to penetrating through glass.

And, when the interlayer film for laminated glasses has a three-layers structure, it is preferred that a storage elasticity modulus G' at 20° C. and a frequency of $5.0\times10^1$ to $1.0\times10^2$ Hz in one or any of two layers composing the outermost layer is at or below a half of a storage elasticity modulus G' at 20° C. and a frequency of $5.0\times10^1$ to $1.0\times10^2$ Hz in an intermediate layer.

In this time, it is preferred that a storage elasticity modulus G' at 20° C. and a frequency of $5.0\times10^1$ to $1.0\times10^2$ Hz in one or any of two layers composing the outermost layer is $2\times10^6$ Pa or lower and a storage elasticity modulus G' at 20° C. and a frequency of $5.0\times10^1$ to $1.0\times10^2$ Hz in the intermediate layer is $1\times10^7$ Pa or higher, and it is furthermore preferred that tan δ of one or any of two layers composing the outermost layer at 20° C. and a frequency of $5.0\times10^1$ to $1.0\times10^2$ Hz is 0.7 or more.

In addition, it is preferred that a storage elasticity modulus G' of the above-mentioned one of two layers composing the outermost layer is at or below a half of a storage elasticity modulus G' of the intermediate layer, and it is more preferred that a storage elasticity modulus G' of any of two layers composing the outermost layer is at or below a half of the storage elasticity modulus G' of the intermediate layer.

And, in such an interlayer film for laminated glasses, it is preferred that a total thickness of the above-mentioned outermost layer is 10% or higher of a total thickness of the interlayer film for laminated glasses. When this thickness is lower than 10% of the total thickness of the interlayer film for laminated glasses, it may be impossible to realize a low HIC value. It is more preferably 14% or higher and furthermore preferably 20% or higher.

When the interlayer film for laminated glasses having such a three-layers structure is employed, the low HIC value is compatible with the resistance to penetrating through glass.

And, when the interlayer film for laminated glasses has a multilayer structure of four-layers or more, it is preferred that a storage elasticity modulus G' at 20° C. and a frequency of $5.0\times10^1$ to $1.0\times10^2$ Hz in one or any of two layers composing the outermost layer is at or below a half of a storage elasticity modulus G' at 20° C. and a frequency of $5.0\times10^1$ to $1.0\times10^2$ Hz in at least one layer of layers composing an intermediate layer. In this time, it is more preferred that a storage elasticity modulus G' at 20° C. and a frequency of $5.0\times10^1$ to $1.0\times10^2$ Hz in one or any of two layers composing the outermost layer is $2\times10^6$ Pa or lower and a storage elasticity modulus G' at 20° C. and a frequency of $5.0\times10^1$ to $1.0\times10^2$ Hz in the intermediate layer is $1\times10^7$ Pa or higher, and it is furthermore preferred that one or any of two layers composing the outermost layer has tan δ of 0.7 or more of at 20° C. and a frequency of $5.0\times10^1$ to $1.0\times10^2$ Hz.

In addition, it is preferred that a storage elasticity modulus G' of the above-mentioned one of two layers composing the outermost layer is at or below a half of a storage elasticity modulus G' of at least one layer of layers composing the intermediate layer, and it is more preferred that a storage elasticity modulus G' of any of two layers composing the outermost layer is at or below a half of the storage elasticity modulus G' of the intermediate layer.

And, in such an interlayer film for laminated glasses, it is preferred that a total thickness of the outermost layer is 10% or higher of a total thickness of the interlayer film for laminated glasses. When this thickness is lower than 10% of the total thickness of the interlayer film for laminated glasses, it may be impossible to realize a low HIC value. It is more preferably 14% or higher and furthermore preferably 20% or higher.

In the case where the above-mentioned interlayer film for laminated glasses has a multilayer structure of three-layers and four-layers or more, it is preferred that the intermediate layer, having the storage elasticity modulus G' of $1\times10^7$ Pa or higher, is biased to the side of either surface layer with respect to the thickness direction of the interlayer film for laminated glasses. When the laminated glass of such a interlayer film for laminated glasses is attached to vehicles and the like in such a way that the side of the interlayer film for laminated glasses, to which the intermediate layer having the storage elasticity modulus G' of $1\times10^7$ Pa or higher is biased, faces inside the vehicles, the HIC value can be reduced in this direction.

As a method of biasing the intermediate layer having the storage elasticity modulus G' of $1\times10^7$ Pa or higher to the side of either surface layer like this, there are given, for example, a method of increasing a thickness of one outermost layer 1.2 or more times larger than that of the other outermost layer, more preferably 1.5 or more times and furthermore preferably 2.0 or more times and the like.

When the interlayer films for laminated glasses having such a multilayer structure of three-layers and four-layers or more are employed, the low HIC value is compatible with the resistance to penetrating through glass.

In the case where the above-mentioned interlayer film for laminated glasses employs the multilayer structure, the respective resin layers composing the above-mentioned interlayer film for laminated glasses of the multilayer structure preferably have different adhesion in order to realize the above constitution, and for example in the case where the respective resin layers comprise mainly polyvinyl acetal resin, it is conceivable to use a combination of layers in which the content of a plasticizer in each layer is different from each other by an amount of 5 or more parts by weight with respect to 100 parts by weight of the polyvinyl acetal; the respective resin layers comprise resins having different compositions such as the layer comprise polyethylene terephthalate film and polyvinyl acetal resin; amounts of adhesion control agents blended into the respective resin layers are different; and the respective resin layers have different acetalization degrees.

The above-mentioned adhesion control agent is not particularly limited and by containing metal salt of carboxylate having 2 to 6 carbon atoms in the above-mentioned resin layer, it is possible to adjust adhesion of an interlayer film for laminated glasses to a glass sheet in a desired range and simultaneously to protect the secular degradation of adhesion and protection of whitening is compatible with protection of secular degradation of adhesion.

As the above-mentioned metal salt of carboxylic acid, there are given, for example, metal salt of pentanoate (5 carbon atoms), metal salt of hexanoate (2-ethyl butanoate) (6 carbon atoms), metal salt of heptanoate (7 carbon atoms), and metal salt of octanoate (8 carbon atoms). These may be used alone or may be used in combination of two or more species. And, the above-mentioned carboxylic acid may be a straight-chain type or a side-chain type.

Thickness of the above-mentioned interlayer film for laminated glasses is not particularly limited but a preferable lower limit is 300 μm and a preferable upper limit is 3 mm. A more preferable lower limit is 500 μm and a more preferable upper limit is 2 mm.

In the above-mentioned interlayer film for laminated glasses, embossing may be applied to the surface of a layer to contact with glass. By applying embossing, adhesion of an interlayer film for laminated glasses to a glass sheet can be adjusted in a desired range.

The above-mentioned interlayer film for laminated glasses is preferably one in which a break of 10 mm or longer in length is generated when measuring the above HIC value (EEVC) or the above HIC value (ECE). Since generation of the break requires more energy than stretching, by breaking, it is possible to absorb energy of the impactor head and reduce the HIC value. In addition, when the break is not in the form of a line but a plurality of breaks or a branched break is generated, the total length of breaks is preferably 10 mm or longer. More preferable length of the break is 20 mm or longer, and furthermore preferably 50 mm or longer.

A method of attaining such an interlayer film for laminated glasses is not particularly limited and includes a method of appropriately adjusting breaking tensile strength, breaking extension rate, breaking energy, etc. of the interlayer film for laminated glasses and in addition providing slits to facilitate the occurrence of break or weak portions such as a thin portion in part of the interlayer film for laminated glasses.

By using the interlayer film for laminated glasses described above, a laminated glass realizing the low HIC value can be obtained.

These interlayer films for laminated glasses also constitute the present invention.

Next, there will be described the case (2) where an impact is absorbed by reducing a thickness of a glass portion to shatter readily in collision. In this case, a laminated glass, in which a thickness of at least one glass sheet is 1.8 mm or smaller, is suitably used. Such a laminated glass can absorb an impact through the ease of deformation and/or shattering of glass in collision. In addition, the HIC value of the laminated glass has a strong relationship with deformation in collision and the HIC value of the laminated glass decreases as a magnitude of deformation in collision increases. That is, the larger the deformation of the laminated glass, the smaller the HIC value. And, by thickening the other glass sheet more than 1.8 mm, durability as a laminated glass is compatible with the HIC value.

Incidentally, when a laminated glass of a structure using glass sheets having different thickness is used as glass for vehicles, more thick side of the glass may be used as the outside of the vehicle or as the inside of the vehicle, but it is preferably used as the outside of the vehicle in order to enhance the durability as glass.

Next, there will be described the case (3) where by replacing glass on one side (inner side in using the laminated glass as glass for vehicles) of a laminated glass with a resin plate, impact-absorbency of the overall laminated glass is enhanced. As such a laminated glass, for example, a substance in which the interlayer film for laminated glasses is sandwiched between a glass sheet and a transparent resin plate is preferred. When a laminated glass is formed, it is preferred that haze is 2% or less and an impactor dropping height is 4 m or more. In such a laminated glass, since performance of absorbing an impact is adequately high compared with a laminated glass of which two sides comprise glass, the HIC value (EEVC) of 1,000 or lower and the HIC value (ECE) of 300 or lower can be attained.

The above-mentioned transparent resin plate is not particularly limited but for example, a resin plate comprising polycarbonate, acrylic resin, acrylic copolymerizable resin or polyester resin is preferred because of being excellent in visible transmittance and haze and a resin plate having an impactor dropping height of 4 m or more is preferred.

And, since above-mentioned transparent resin plate is generally prone to being damaged, it is preferably coated with transparent elastomer in order to use as glass for vehicles.

The above-mentioned transparent elastomer is not particularly limited and includes, for example, urethane type elastomer, nylon type elastomer, straight-chain low density polyethylene, etc.

In the laminated glass of the present invention, a method of producing a interlayer film for laminated glasses is not particularly limited and includes, for example, a method in which resin component such as polyvinyl acetal resin described above, a plasticizer and other additive as required are blended and mixed uniformly and then a film is formed in sheet form by conventional methods publicly known such as extrusion process, calendar process, press process, casting process and film blowing process.

A method of producing a interlayer film for laminated glasses, having a multilayer structure, is not particularly limited and includes, for example, a method in which resin component such as polyvinyl acetal resin described above, a plasticizer and other additive as required are blended and mixed uniformly and then the respective layer are extruded together, and a method of laminating two or more resin films prepared by the above-mentioned method by press process or laminate process. The not-yet-laminated resin film to be used in the method of laminating by press process or laminate process may be a single layer structure or may be a multilayer structure.

And, a method of fabricating the laminated glass of the present invention is not particularly limited and a publicly known method of fabricating laminated glasses can be employed. For example, when the laminated glass of the present invention has a constitution in which a interlayer film for laminated glasses is sandwiched between two glass sheets, it can be fabricated by sandwiching the above interlayer film for laminated glasses between two glass sheets, putting this in a rubber bag, bonding preliminarily two glass sheets to each other at 70 to 110° C. while evacuating under reduced pressure and then using an autoclave or pressing to bond two glass sheets to each other in earnest at about 120 to 150° C. and a pressure of about 10 to 15 kg/cm$^2$.

Further, in the above-mentioned method of fabricating the laminated glass, a method of interposing an interlayer film for laminated glasses, comprising polyvinyl butyral resin plasticized, between at least a pair of glass sheets, and deaerating by vacuum aspiration and simultaneously attaching the glasses to each other by heat and pressure at 60 to 100° C. may be employed. More specifically, the fabrication of the laminated glass of the present invention is implemented by putting a laminate of a glass sheet/an interlayer film/a glass sheet in a rubber bag and attaching two glass sheets to each other by heat and pressure at a temperature of about 60 to 100° C. and a pressure of about 1 to 10 kg/cm$^2$ for 10 to 30 minutes, for example, in an autoclave while aspirating and deaerating under a reduced pressure of about −500 to −700 mmHg to perform deaeration and adhesion simultaneously.

In this method of fabrication, adhesion between the interlayer film for laminated glasses and the glass sheet can be adjusted so as to fall within desired proper limits by keeping the temperature in attaching glasses to each other by heat and pressure within a range of 60 to 100° C. and appropriately setting various conditions such as a pressure for attaching by pressure, a time for attaching by pressure and a vacuum in deaerating by aspiration within a range of the extent described above.

Since the laminated glass of the present invention has an HIC value (EEVC) of 1,000 or lower or an HIC value (ECE) of 300 or lower, it becomes one which have the high performance for mitigating the impact given externally and, particularly in the case of using it as glass for vehicles, have the high performance for mitigating the impact when head comes into collision with the glass due to the occurrence of a personal accident.

When the laminated glass of the present invention is used as glass for vehicles and fixed to a window's frame, there is tendency that the HIC value is higher particularly at locations close to the window's frame and the lower-end of the window. And, in the occurrence of a personal accident, a probability that a location with which the head of a pedestrian comes into collision is a lower end of the glass for vehicles (especially a windshield) is high. Therefore, the laminated glass may be adjusted in such a way that the HIC value particularly in a location close to the window's frame and the lower end of the window is low. That is, by use of the interlayer film for laminated glasses having wedged form that thickness increases gradually from one end toward the other end or the interlayer film for laminated glasses having a configuration in which peripheral portion is more thick than a central portion, it is possible to make the HIC value low particularly in a location close to the window's frame and the lower end of the window.

In such a laminated glass, an interlayer film for laminated glasses, comprising only a single layer and having wedged form, may be used, but it is preferred to use an interlayer film for laminated glasses, for example, which has a multilayer structure of three-layers or more and in which each layer has wedged form and the layer having wedged form is alternately overlaid with the layer of wedged having a small storage elasticity modulus G' taken as an intermediate layer so that an overall thickness becomes uniform. When a windshield comprising the laminated glass using such an interlayer film for laminated glasses having a multilayer structure is arranged in such a way that a base of wedged form of the intermediate layer having a small storage elasticity modulus G' is located at a lower end, an HIC value of a lower end of the windshield in which there is a high risk of collision can be reduced, and in addition an upper end of the windshield in which there is a low risk of collision can secure strength.

The interlayer film for laminated glasses thus constructed can be produced by using a die which can perform profile extrusion and conducting multi-layer extrusion in such a way that every layer becomes wedged.

In the laminated glass of the present invention, it is preferred that electromagnetic wave shielding performance in frequencies of 0.1 to 26.5 GHz is 10 dB or less, haze is 1% or lower, visible transmittance is 70% or higher, and solar radiation transmittance in a wavelength region of 300 nm to 2,100 nm is 85% or lower of visible transmittance. And, solar radiation transmittance in a wavelength region of 300 nm to 2,100 nm is preferably 80% or lower of visible transmittance. The laminated glass of the present invention satisfying such conditions satisfies the performance of protecting pedestrians by the low HIC value and simultaneously allows an amount of heat rays from solar radiation reaching the vehicle's interior to decrease, and therefore a temperature rise within interior of the automobile can be suppressed and a comfortable interior space can be realized. And, since the laminated glass of the present invention has the electromagnetic wave transparency in a frequency band of 0.1 to 26.5 GHz, it can transmit electromagnetic wave in a frequency band required for information communication such as 3.5 MHz band and 7 MHz band of amateur radio, a frequency band of 10 MHz or lower of emergency communication, 2.5 GHz of VICS (the Vehicle Information Communication System), 5.8 GHz of ETC (Electronic Toll Collections) and 12 GHz of satellite broadcasting without problems.

In order to impart such a function to the laminated glass of the present invention, the polyvinyl acetal resin, constituting the interlayer film for laminated glasses, preferably contains metal oxide particles having a function of screening out heat rays. In addition, when the interlayer film for laminated glasses has a multilayer structure, polyvinyl acetal resin of at least one layer may contains metal oxide particles having a function of screening out heat rays.

The above-mentioned particles of metal oxide is not particularly limited but for example, tin-doped indium oxide and/or antimony-doped tin oxide is suitable. Preferably, the above-mentioned tin-doped indium oxide and/or antimony-doped tin oxide has an average diameter of secondary particles formed by flocculation of 80 nm or smaller and is dispersed in polyvinyl acetal resin in such a way that a secondary particle formed by flocculation of 100 nm or larger in diameter has a density of 1 particle/$\mu m^2$ or less in polyvinyl acetal resin. When a state of dispersion of the particles of metal oxide was out of the above-mentioned range, the transparency of visible light of the laminated glass to be obtained may be deteriorated or haze may become larger.

As for the content of the above-mentioned particles of metal oxide, a preferable lower limit is 0.05 parts by weight and a preferable upper limit is 5.0 parts by weight with respect to 100 parts by weight of polyvinyl acetal resin. When the content is less than 0.05 parts by weight, an adequate effect of screening out heat rays may not be attained, and when it is more than 5.0 parts by weight, the transparency of visible light of the laminated glass to be obtained may be deteriorated or haze may become larger.

Further, when the interlayer film for laminated glasses has a multilayer structure, a preferable lower limit is 0.05 parts by weight and a preferable upper limit is 5.0 parts by weight with respect to 100 parts by weight of polyvinyl acetal resin in all layers.

EFFECT OF THE INVENTION

In accordance with the present invention, it is possible to provide to a laminated glass and an interlayer film for laminated glasses, which have the high performance for mitigating the impact given externally and, particularly in the case of using it as glass for vehicles, have the high performance for mitigating the impact when head comes into collision with the glass due to the occurrence of a personal accident.

BEST MODES FOR CARRYING OUT THE INVENTION

Hereinafter, the present invention will be described in details with reference to examples, however the present invention is not limited to these examples.

EXAMPLE 1

(1) Preparation of Interlayer Film for Laminated Glass 100 parts by weight of polyvinyl butyral resin (an acetalization degree 68.0 mole %, a proportion of a vinyl acetate component 0.6 mole %), in which a half band width of a peak, obtained in measuring infrared absorption spectra, corresponding to a hydroxyl group is 245 cm$^{-1}$, and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film having a thickness of 800 µm and this film was employed as an interlayer film for laminated glasses.

Next, the resulting interlayer film for laminated glasses was sandwiched between two clear float glasses of 2 mm in thickness and this was put in a rubber bag and deaerated at a vacuum of 2,660 Pa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 118 N/cm$^2$ for 20 minutes in an autoclave to obtain a laminated glass.

The obtained interlayer film for laminated glasses and laminated glass were evaluated according to the following methods.

The results are shown in Table 1.

(Measurement of HIC Value (EEVC))

An HIC value (EEVC) of the laminated glass was measured using an apparatus for measuring HIC having a structure shown in FIG. 1. When the HIC value is 1,000 or lower, the laminated glass is rated as acceptance (o), and when the HIC value is higher than 1,000, it is rated as inacceptance (x).

(Measurement of HIC Value (ECE))

An HIC value (ECE) of the laminated glass was measured by dropping an impactor head from a height of 4 m above the surface of the laminated glass and allowing the impactor to collide against the laminated glass using an apparatus for measuring HIC having a structure shown in FIG. 2.

Further, when a break is generated in the interlayer film for laminated glasses during the measurement, the length of the break was measured.

(Measurement of Maximum Stress σ, Fracture Point Deformation ε and Breaking Energy U of Interlayer Film for Laminated Glasses)

The interlayer film for laminated glass was processed into a dumbbell No. 1 (according to JIS K 6771) specimen and stretched at a tensile speed of 500%/min using a tension tester and breaking tensile strength (kg/cm$^2$) was measured at a measuring temperature of 20° C. A stress a (MPa)—deformation ε (%) curve was determined from the obtained data. Here, 500%/min means a speed of moving the distance 5 times longer than that between chucks of a specimen per 1 minute.

Next, maximum stress a and fracture point deformation ε are determined from the obtained stress-deformation curve and breaking energy U was derived from the above-mentioned equation (2).

(Measurement of Storage Elasticity Modulus G' and Tan δ of Resin Film and Interlayer Film for Laminated Glasses)

Shear viscoelasticity in the range of 50 to 100 Hz was measured at 20° C. using a dynamic viscoelasticity measuring apparatus (apparatus; DVA-200, manufacturer; IT Keisoku Seigyo Co., Ltd.), and a maximum value of storage elasticity modulus obtained in measuring is taken as G' (max) and a minimum value is taken as G' (min) and a maximum value of tan δ obtained in measuring is taken as tan δ (max).

EXAMPLE 2

100 parts by weight of polyvinyl butyral resin (an acetalization degree 68.0 mole %, a proportion of a vinyl acetate component 0.6 mole %) and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film having a thickness of 1,500 µm and this film was employed as an interlayer film for laminated glasses. And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 3

100 parts by weight of polyvinyl butyral resin (an acetalization degree 68.0 mole %, a proportion of a vinyl acetate component 0.6 mole %) and 45 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film having a thickness of 760 µm and this film was employed as an interlayer film for laminated glasses. And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 4

100 parts by weight of polyvinyl butyral resin (an acetalization degree 68.0 mole %, a proportion of a vinyl acetate component 0.6 mole %) and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (1) having a thickness of 340 µm.

Next, 100 parts by weight of polyvinyl butyral resin (an acetalization degree 65.0 mole %, a proportion of a vinyl acetate component 14 mole %) and 62 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (2) having a thickness of 120 µm.

A storage elasticity modulus G' and tan δ of the obtained resin films were measured by the method described above.

The results are shown in Table 2.

The resulting resin film (2) was sandwiched between two resin films (1) and these films were attached to each other by heat and pressure by conducting heating press to obtain an interlayer film for laminated glasses having a three-layers structure. In FIG. 3, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 5

100 parts by weight of polyvinyl butyral resin (an acetalization degree 68.0 mole %, a proportion of a vinyl acetate component 0.6 mole %) and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (3) having a thickness of 250 µm.

Next, 100 parts by weight of polyvinyl butyral resin (an acetalization degree 65.0 mole %, a proportion of a vinyl acetate component 14 mole %) and 60 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (4) having a thickness of 250 µm.

A storage elasticity modulus G' and tan δ of the obtained resin films were measured by the method described above.

The results are shown in Table 2.

The resulting resin film (4) was sandwiched between two resin films (3) and these films were attached to each other by heat and pressure by conducting heating press to obtain an interlayer film for laminated glasses having a three-layers structure. In FIG. 4, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 6

100 parts by weight of polyvinyl butyral resin (an acetalization degree 68.0 mole %, a proportion of a vinyl acetate component 0.6 mole %) and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (5) having a thickness of 300 µm.

Next, 100 parts by weight of polyvinyl butyral resin (an acetalization degree 65.0 mole %, a proportion of a vinyl acetate component 14 mole %) and 60 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (6) having a thickness of 300 µm.

A storage elasticity modulus G' and tan δ of the obtained resin films were measured by the method described above.

The results are shown in Table 2.

The resulting resin film (6) was sandwiched between two resin films (5) and these films were attached to each other by heat and pressure by conducting heating press to obtain an interlayer film for laminated glasses having a three-layers structure. In FIG. 5, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 7

100 parts by weight of polyvinyl butyral resin (an acetalization degree 68.0 mole %, a proportion of a vinyl acetate component 0.6 mole %) and 38 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (7) having a thickness of 500 µm and a resin film (8) having a thickness of 200 µm.

A storage elasticity modulus G' and tan δ of the obtained resin films were measured by the method described above.

The results are shown in Table 2.

The resin film (4) obtained in Example 5 was sandwiched between the obtained resin film (7) and the obtained resin film (8) and these films were attached to each other by heat and pressure by conducting heating press to obtain an interlayer film for laminated glasses having a three-layers structure. In FIG. 6, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1. In addition, an HIC value (EEVC) and an HIC value (ECE) were measured by colliding an impactor head to the surface of glass bonded to the side of the resin film (8).

EXAMPLE 8

100 parts by weight of polyvinyl butyral resin (an acetalization degree 65.0 mole %, a proportion of a vinyl acetate component 14 mole %) and 50 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (9) having a thickness of 450 µm.

A storage elasticity modulus G' and tan δ of the obtained resin film were measured by the method described above.

The results are shown in Table 2.

The resin film (5) obtained in Example 6 was superimposed over the obtained resin film (9), and the superimposed resin films were attached to each other by heat and pressure by conducting heating press to obtain an interlayer film for laminated glasses having a two-layers structure. In FIG. 7, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1. In addition, an HIC value (EEVC) and an HIC value (ECE) were measured by colliding an impactor head for measuring HIC to the surface of glass bonded to the side of the resin film (5).

EXAMPLE 9

The resin film (7) obtained in Example 7 was sandwiched between two resin films (2) obtained in Example 3, and these films were attached to each other by heat and pressure by conducting heating press to obtain an interlayer film for laminated glasses having a three-layers structure. In FIG. 8, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 10

The resin film (7) obtained in Example 7 was sandwiched between the resin film (2) obtained in Example 3 and the resin film (5) obtained in Example 6, and these films were attached to each other by heat and pressure by conducting heating press to obtain an interlayer film for laminated glasses having a three-layers structure. In FIG. 9, there is shown a schematic view showing a constitution of the obtained interlayer film for laminated glasses.

And, using the obtained interlayer film for laminated glasses, a laminated glass was obtained by following the same procedure as in Example 1.

The obtained interlayer film for laminated glasses and laminated glass were evaluated in the same manner as in Example 1. In addition, an HIC value (EEVC) and an HIC value (ECE) were measured by colliding an impactor head for measuring HIC to the surface of glass bonded to the side of the resin film (5).

EXAMPLE 11

100 parts by weight of polyvinyl butyral resin (an acetalization degree 65.0 mole %, a proportion of a vinyl acetate component 14 mole %), in which a half band width of a peak, obtained in measuring infrared absorption spectra, corresponding to a hydroxyl group is 190 cm$^{-1}$, and 45 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film having a thickness of 760 μm and this film was employed as an interlayer film for laminated glasses. And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 12

An aqueous solution of polyvinyl alcohol, which was formed by dissolving polyvinyl alcohol having an average polymerization degree of 1,500 and a saponification degree of 99.5 mole % in pure water so as to be 10% by weight in concentration, was prepared. To 100 parts by weight of this aqueous solution of polyvinyl alcohol were added 0.8 parts by weight of 10% hydrochloric acid as an acid catalyst and 5.73 parts by weight of butylaldehyde. Then, this mixture was reacted at 85 to 95° C. for one hour while being stirred. Then, 3.5 parts by weight of 10% hydrochloric acid as an acid catalyst was added to the mixture and the mixture was reacted at 85° C. for 2 hours while being stirred to obtain particles of a crosslinked polyvinyl butyral resin. An average particle diameter of the obtained crosslinked polyvinyl butyral resin particle was 1.0 μm.

100 parts by weight of polyvinyl butyral resin (an acetalization degree 65.0 mole %, a proportion of a vinyl acetate component 0.6 mole %), 30 parts by weight of triethylene glycol di-2-ethylhexanoate (3GO) as a plasticizer and 5 parts by weight of the obtained crosslinked polyvinyl butyral resin particles were mixed, and the mixture was adequately melted and kneaded with a mixing roller and then was formed at 150° C. for 30 minutes with a press forming machine to obtain a resin film having a thickness of 760 μm and this film was employed as an interlayer film for laminated glasses. And, using the obtained interlayer film for laminated glasses, a laminated glass was obtained by following the same procedure as in Example 1.

The obtained interlayer film for laminated glasses and laminated glass were evaluated in the same manner as in Example 1.

EXAMPLE 13

100 parts by weight of crosslinked polyvinyl butyral resin prepared in Example 12 and 40 parts by weight of triethylene glycol di-2-ethylbutyrate as a plasticizer were mixed, and the mixture was adequately melted and kneaded with a kneader and then was formed at 150° C. and a pressure of 980 N/cm$^2$ for 20 minutes with a press forming machine to obtain a resin film having a thickness of 860 μm and this film was employed as an interlayer for laminated glass. And, using the obtained interlayer film for laminated glasses, a laminated glass was obtained by following the same procedure as in Example 1.

The obtained interlayer film for laminated glasses and laminated glass were evaluated in the same-manner as in Example 1.

TABLE 1

|  | Example 1 | Example 2 | Example 3 | Example 4 | Example 5 | Example 6 | Example 7 |
|---|---|---|---|---|---|---|---|
| Storage elasticity modulus G' (max)(Pa) | 4.3 × 10$^7$ | 4.2 × 10$^7$ | 2.7 × 10$^7$ | 2.6 × 10$^6$ | 1.5 × 10$^6$ | 1.0 × 10$^6$ | 1.7 × 10$^6$ |
| tan δ (max) | 0.54 | 0.55 | 0.54 | 0.70 | 0.76 | 0.83 | 0.74 |
| Maximum stress σ (MPa) | 26.4 | 38.2 | 17.5 | 25.3 | 14.3 | 15.8 | 15.8 |
| Fracture point deformation ε (%) | 440 | 320 | 450 | 450 | 340 | 370 | 320 |

TABLE 1-continued

| | | | | | | | |
|---|---|---|---|---|---|---|---|
| Breaking energy U (J/mm$^2$) | 1.7 | 1.9 | 1.2 | 2.0 | 0.75 | 1.1 | 1.3 |
| Corresponding drawing of the case of multilayer structure | — | — | — | 3 | 4 | 5 | 6 |
| Ratio of thickness of layer having G' of $2 \times 10^6$ Pa or smaller (%) | — | — | — | 15.0 | 33.3 | 33.3 | 26.3 |
| HIC value (EEVC) | ○ | ○ | ○ | ○ | ○ | ○ | ○ |
| HIC value (ECE) | 281 | 375 | 215 | 240 | 174 | 169 | 167 |
| Length of break in interlayer (mm) | 0 | 0 | 0 | 0 | 60 | 95 | 50 |

| | Example 8 | Example 9 | Example 10 | Example 11 | Example 12 | Example 13 |
|---|---|---|---|---|---|---|
| Storage elasticity modulus G' (max)(Pa) | $2.0 \times 10^6$ | $2.1 \times 10^6$ | $1.9 \times 10^6$ | $3.8 \times 10^7$ | $4.3 \times 10^7$ | $4.0 \times 10^7$ |
| tan δ (max) | 0.81 | 0.77 | 0.80 | 0.61 | 0.61 | 0.56 |
| Maximum stress σ (MPa) | 17.0 | 15.1 | 12.4 | 15.9 | 19.5 | 16.2 |
| Fracture point deformation ε (%) | 390 | 350 | 380 | 420 | 420 | 380 |
| Breaking energy U (J/mm$^2$) | 1.2 | 0.89 | 0.79 | 1.1 | 1.6 | 1.3 |
| Corresponding drawing of the case of multilayer structure | 7 | 8 | 9 | — | — | — |
| Ratio of thickness of layer having G' of $2 \times 10^6$ Pa or smaller (%) | — | 32.4 | 45.7 | — | — | — |
| HIC value (EEVC) | ○ | ○ | ○ | ○ | ○ | ○ |
| HIC value (ECE) | 170 | 181 | 171 | 234 | 242 | 222 |
| Length of break in interlayer (mm) | 55 | 70 | 80 | 0 | 0 | 0 |

TABLE 2

| | Resin film (1) | Resin film (2) | Resin film (3) | Resin film (4) | Resin film (5) | Resin film (6) | Resin film (7) | Resin film (8) | Resin film (9) |
|---|---|---|---|---|---|---|---|---|---|
| Storage elasticity modulus G' (max) (Pa) | — | $6.8 \times 10^5$ | — | $6.7 \times 10^5$ | — | $6.7 \times 10^5$ | — | — | $1.5 \times 10^6$ |
| Storage elasticity modulus G' (min) (Pa) | $4.5 \times 10^7$ | — | $4.3 \times 10^7$ | — | $4.3 \times 10^7$ | — | $4.3 \times 10^7$ | $4.3 \times 10^7$ | — |
| tan δ (max) | 0.56 | 0.99 | 0.55 | 1.00 | 0.55 | 0.99 | 0.54 | 0.55 | 0.90 |
| Thickness (μm) | 340 | 120 | 250 | 250 | 300 | 300 | 500 | 200 | 450 |

EXAMPLE 14

The interlayer film for laminated glasses obtained by following the same procedure as in Example 1 was sandwiched between two clear float glasses of 1.8 mm and 4 mm in thickness, respectively, and this was put in a rubber bag and deaerated at a vacuum of 2,660 Pa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 118 N/cm$^2$ for 20 minutes in an autoclave to obtain a laminated glass.

An HIC value (EEVC) and an HIC value (ECE) of the obtained laminated glass were measured by colliding an impactor head for measuring HIC to the glass on the side of the float glass of 4 mm in thickness by the method described above.

The results are shown in Table 3.

EXAMPLE 15

An HIC value (EEVC) and an HIC value (ECE) of the laminated glass obtained by following the same procedure as in Example 14 were measured by colliding an impactor head for measuring HIC to the glass on the side of the float glass of 1.8 mm in thickness by the method described above.

The results are shown in Table 3.

EXAMPLE 16

The interlayer film for laminated glasses obtained by following the same procedure as in Example 1 was sandwiched between a float glasses of 2.5 mm in thickness and polymethyl methacrylate of 1.0 mm in thickness, which is provided with a scratch protection layer comprising transparent elastomer on the surface, and this was put in a rubber bag and deaerated at a vacuum of 2,660 Pa for 20 minutes, and then this was moved into an oven in a state of being deaerated and subjected to vacuum press while being further retained at 90° C. for 30 minutes. A laminated glass formed preliminarily by thus attaching the float glass and polymethyl methacrylate to each other by applying pressure was subjected to attaching by pressure under the conditions of 135° C. and a pressure of 118 N/cm² for 20 minutes in an autoclave to obtain a laminated glass.

An HIC value (EEVC) and an HIC value (ECE) of the obtained laminated glass were measured by colliding an impactor head for measuring HIC to the glass on the side of the float glass by the method described above.

The results are shown in Table 3.

EXAMPLE 17

100 parts by weight of polyvinyl butyral resin (an acetalization degree 65.0 mole %, a proportion of a vinyl acetate component 0.6 mole %) and 30 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine. In forming by a press forming machine, the resin was processed in such a way that a thickness of one end is 660 μm and a thickness of an opposite end of other side is 860 μm to obtain a resin film of wedged and this resin film was employed as an interlayer film for laminated glasses.

A laminated glass was prepared by following the same procedure as in Example 1 except for using the obtained interlayer film for laminated glasses.

An HIC value (EEVC) and an HIC value (ECE) of the obtained laminated glass were measured by the method described above.

The results are shown in Table 3.

EXAMPLE 18

A resin film of 100 μm in thickness comprising polyethylene terephthalate was sandwiched between two resin films (1) obtained in Example 4, and these films were attached to each other by heat and pressure by conducting heating press to obtain an interlayer film for laminated glasses having a three-layers structure. In FIG. 10, there is shown a schematic view showing a constitution of the obtained interlayer film for laminated glasses.

A laminated glass was prepared by following the same procedure as in Example 1 except for using the obtained interlayer film for laminated glasses.

An HIC value (EEVC) and an HIC value (ECE) of the obtained laminated glass were measured by the method described above.

The results are shown in Table 3.

EXAMPLE 19

100 parts by weight of polyvinyl butyral resin (an acetalization degree 65.0 mole %, a proportion of a vinyl acetate component 0.6 mole %) and 30 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine. In forming by a press forming machine, there was obtained a resin film (10) in wedged form having a cross section of a right-angled triangle of 430 μm in base and 500 mm in height.

And, 100 parts by weight of polyvinyl butyral resin (an acetalization degree 65.0 mole %, a proportion of a vinyl acetate component 14 mole %) and 50 parts by weight of triethylene glycol di-2-ethylhexanoate (3GO) as a plasticizer were mixed, and the mixture was adequately melted and kneaded with a mixing roller and then was formed at 150° C. for 30 minutes with a press forming machine to obtain a resin film (11) in wedged form having a cross section of a isosceles triangle of 860 μm in base and 500 mm in height.

Two resin films (10) in wedged form having a cross section of a right-angled triangle were laminated on the resin film (11) in wedged form having a cross section of a isosceles triangle, and this laminate was employed as an interlayer for laminated glass having a uniform thickness.

A laminated glass was prepared by following the same procedure as in Example 1 except for using the obtained interlayer film for laminated glasses. In FIG. 11, there is shown a schematic view showing a constitution of the obtained interlayer film for laminated glasses.

An HIC value (EEVC) and an HIC value (ECE) of the obtained laminated glass were measured by the method described above.

The results are shown in Table 3.

EXAMPLE 20

5-mm-long straight slits were cut with 20-mm pitches in the surface of a resin film of 100 μm in thickness comprising polyethylene terephthalate. Further, similar straight slits parallel to one another were cut with 100-mm pitches throughout the resin film comprising polyethylene terephthalate.

The obtained resin film, in the surface of which slits was cut, having a thickness of 100 μm and comprising polyethylene terephthalate was sandwiched between two resin films (1) obtained in Example 4, and these films were attached to each other by heat and pressure by conducting heating press to obtain a interlayer film for laminated glasses having a three-layers structure. In FIG. 12, there is shown a schematic view showing a constitution of the obtained interlayer film for laminated glasses.

A laminated glass was prepared by following the same procedure as in Example 1 except for using the obtained interlayer film for laminated glasses.

An HIC value (EEVC) and an HIC value (ECE) of the obtained laminated glass were measured by the method described above.

The results are shown in Table 3.

TABLE 3

|  | Example 14 | Example 15 | Example 16 | Example 17 | Example 18 | Example 19 | Example 20 |
| --- | --- | --- | --- | --- | --- | --- | --- |
| HIC value (EEVC) | ◯ | ◯ | ◯ | ◯ | ◯ | ◯ | ◯ |
| HIC value (ECE) | 222 | 225 | 262 | 278 | 350 | 200 | 185 |
| Corresponding drawing of the case of multilayer structure | — | — | — | — | 10 | 11 | 12 |

TABLE 3-continued

|  | Example 14 | Example 15 | Example 16 | Example 17 | Example 18 | Example 19 | Example 20 |
|---|---|---|---|---|---|---|---|
| Length of break in the interlayer (mm) | 0 | 0 | 0 | 0 | 0 | 0 | 105 |

EXAMPLE 21

(Preparation of ITO-dispersed Plasticizer)

Into 100 parts by weight of triethylene glycol di-2-ethylhexanoate (3GO), 2.5 parts by weight of tin-doped indium oxide (ITO) powder was charged and the ITO particles was dispersed in 3GO with a horizontal microbead mill using polyphosphate salt as a dispersant. Then, to the resulting dispersion, 0.25 parts by weight of acetyl acetone was added while stirring to obtain an ITO-dispersed plasticizer.

An interlayer film for laminated glasses, having a thickness of 800 μm, was prepared by following the same procedure as in Example 1 except for using 38 parts by weight of an ITO-dispersed plasticizer obtained in place of 38 parts by weight of triethylene glycol di-2-ethylhexanoate (3GO), and using this, a laminated glass was prepared.

EXAMPLE 22

A resin film (12) having a thickness of 340 μm was prepared by following the same procedure as in Example 4 except for using 38 parts by weight of an ITO-dispersed plasticizer obtained in Example 20 in place of 38 parts by weight of triethylene glycol di-2-ethylhexanoate (3GO) in preparation on the resin film (1).

And, a resin film (13) having a thickness of 120 μm was prepared by following the same procedure as in Example 4 except for using 62 parts by weight of the ITO-dispersed plasticizer obtained in Example 20 in place of 62 parts by weight of triethylene glycol di-2-ethylhexanoate (3GO) in preparation on the resin film (2).

A storage elasticity modulus G' and tan δ of the obtained resin films (12) and (13) were measured by the method described above and further a state of dispersion of ITO particles was evaluated by the following method. The results are shown in Table 4.

(Evaluation of State of Dispersion of ITO Particles)

An ultra-thin slice of a section of an interlayer for laminated glass was prepared and photography was conducted using a transmission electron microscope (TEM; H-7100 FA manufactured by Hitachi, Ltd.). In addition, an area of 3 μm×4 μm was photographed at a magnification of 20,000 times and this photograph was enlarged to 3 times in a printing stage.

Longer diameters of particle diameters of all ITO particles in photo scope of 3 μm×4 μm were measured and an average particle diameter was derived by a cumulative average. Further, number of particles of 100 nm or larger in particle diameter existing in a photo scope was determined and by dividing this number of particles by a photo area of 12 μm², number of particles per 1 μm² was determined.

The resin film (13) was sandwiched between two resin films (12) and these films were attached to each other by heat and pressure by conducting heating press to obtain an interlayer film for laminated glasses having a three-layers structure. In FIG. 13, there is shown a schematic view showing a constitution of the obtained interlayer film for laminated glasses.

Using the obtained interlayer film for laminated glasses, a laminated glass was obtained by following the same procedure as in Example 1.

EXAMPLE 23

The resin film (2) obtained in Example 4 was sandwiched between two resin films (12) obtained in Example 21 and these films were attached to each other by heat and pressure by conducting heating press to obtain an interlayer film for laminated glasses having a three-layers structure. In FIG. 14, there is shown a schematic view showing a constitution of the obtained interlayer film for laminated glasses.

Using the obtained interlayer film for laminated glasses, a laminated glass was obtained by following the same procedure as in Example 1.

EXAMPLE 24

(Preparation of ATO-dispersed Plasticizer)

Into 100 parts by weight of triethylene glycol di-2-ethylhexanoate (3GO), 3.0 parts by weight of antimony-doped tin oxide (ATO) powder was charged and the ATO particles was dispersed in 3GO with a horizontal microbead mill using polyphosphate salt as a dispersant. Then, to the resulting dispersion, 0.25 parts by weight of acetyl acetone was added while stirring to obtain an ATO-dispersed plasticizer.

And, a resin film (14) having a thickness of 120 μm was prepared by following the same procedure as in Example 4 except for using 62 parts by weight of the ATO-dispersed plasticizer obtained in place of 62 parts by weight of triethylene glycol di-2-ethylhexanoate (3GO) in preparation on the resin film (2).

A storage elasticity modulus G' and tan δ of the obtained resin film (14) were measured by the method described above and a state of dispersion of ATO particles was evaluated by following the same method as in ITO particles. The results are shown in Table 4.

The obtained resin film (14) was sandwiched between two resin films (1) obtained in Example 4 and these films were attached to each other by heat and pressure by conducting heating press to obtain an interlayer film for laminated glasses having a three-layers structure. In FIG. 15, there is shown a schematic view showing a constitution of the obtained interlayer film for laminated glasses.

Using the obtained interlayer film for laminated glasses, a laminated glass was obtained by following the same procedure as in Example 1.

The interlayer film for laminated glasses and the laminated glass obtained in Examples 21 to 24 were evaluated in the same manner as in Example 1.

Further, electromagnetic wave transparency, visible transmittance, solar radiation transmittance and haze of the obtained laminated glass were evaluated by the following method.

The results are shown in Table 5.

(Evaluation of Electromagnetic Wave Shielding Property in Frequencies of 0.1 to 26.5 GHz)

Through measurements by a KEC method (measurement of electromagnetic wave shielding effects in the close field), reflection loss values (dB) of glass in a range of 0.1 to 2 GHz were compared with those of a usual single sheet of float glass of 2.5 nm in thickness and minimum and maximum values of the differences between both reflection loss values in the above-mentioned frequencies were recorded. And, reflection loss values (dB) in a range of 2 to 26.5 GHz were measured by standing a sample with a size of 600 mm square between a pair of the antennas for sending and receiving and radio waves from a radio signal generator were received with a spectrum analyzer and an electromagnetic wave shielding property of the sample was evaluated (method of measuring electromagnetic waves in the far field).

(Measurement of Haze)

Haze was measured according to JIS K 6714.

(Measurement of Visible Transmittance and Solar Radiation Transmittance in Wavelength Region of 300 nm to 2,100 nm)

The transmittance of light of 300 to 2,100 nm in wavelength was measured using a direct recording type Spectrophotometer (UV-3100 manufactured by Shimadzu Corporation), and visible transmittance Tv of 380 to 780 nm in wavelength and solar radiation transmittance Ts of 300 to 2,100 nm in wavelength were determined according to JIS Z 8722 and JIS R 3106 (1998).

TABLE 4

|  | Resin film (12) | Resin film (13) | Resin film (14) |
|---|---|---|---|
| Storage elasticity modulus G' (max) (Pa) | — | $6.9 \times 10^5$ | $7.0 \times 10^5$ |
| Storage elasticity modulus G' (min) (Pa) | $4.7 \times 10^7$ | — | — |
| tan δ (max) | 0.54 | 0.95 | 0.97 |
| Thickness (μm) | 340 | 120 | 120 |
| Average particle diameter of ITO or ATO (nm) | 58 | 58 | 65 |
| Number of particles of 100 nm or larger per 1 μm² (particle) | 0 | 0 | 0 |

TABLE 5

|  | Example 21 | Example 22 | Example 23 | Example 24 |
|---|---|---|---|---|
| Storage elasticity modulus G' (max) (Pa) | $4.4 \times 10^7$ | $3.0 \times 10^6$ | $2.6 \times 10^6$ | $2.9 \times 10^6$ |
| tan δ (max) | 0.55 | 0.66 | 0.71 | 0.68 |
| Maximum stress σ (MPa) | 27.0 | 27.0 | 25.8 | 26.3 |
| Fracture point deformation ε (%) | 400 | 390 | 400 | 420 |
| Breaking energy U (J/mm²) | 1.9 | 2.2 | 2.3 | 2.2 |
| Corresponding drawing of the case of multilayer structure | — | 13 | 14 | 15 |
| Ratio of thickness of layer having G' of $2 \times 10^6$ Pa or smaller (%) | — | 15.0 | 15.0 | 15.0 |
| HIC value (EEVC) | ○ | ○ | ○ | ○ |
| HIC value (ECE) | 290 | 255 | 244 | 239 |
| Electromagnetic wave shielding property ΔdB | 0~1 | 0~1 | 0~1 | 0~1 |
| haze (%) | 0.5 | 0.6 | 0.5 | 0.6 |
| Visible transmittance Tv (%) | 83 | 79 | 83 | 80 |
| Solar radiation transmittance Ts (%) | 56 | 51 | 57 | 59 |
| Length of break in the interlayer (mm) | 0 | 0 | 0 | 0 |

INDUSTRIAL APPLICABILITY

In accordance with the present invention, it is possible to provide to a laminated glass and an interlayer film for laminated glasses, which have the high performance for mitigating the impact given externally and, particularly in the case of using it as glass for vehicles, have the high performance for mitigating the impact when head comes into collision with the glass due to the occurrence of a personal accident.

DESCRIPTION OF THE NUMERALS

Figure 1:
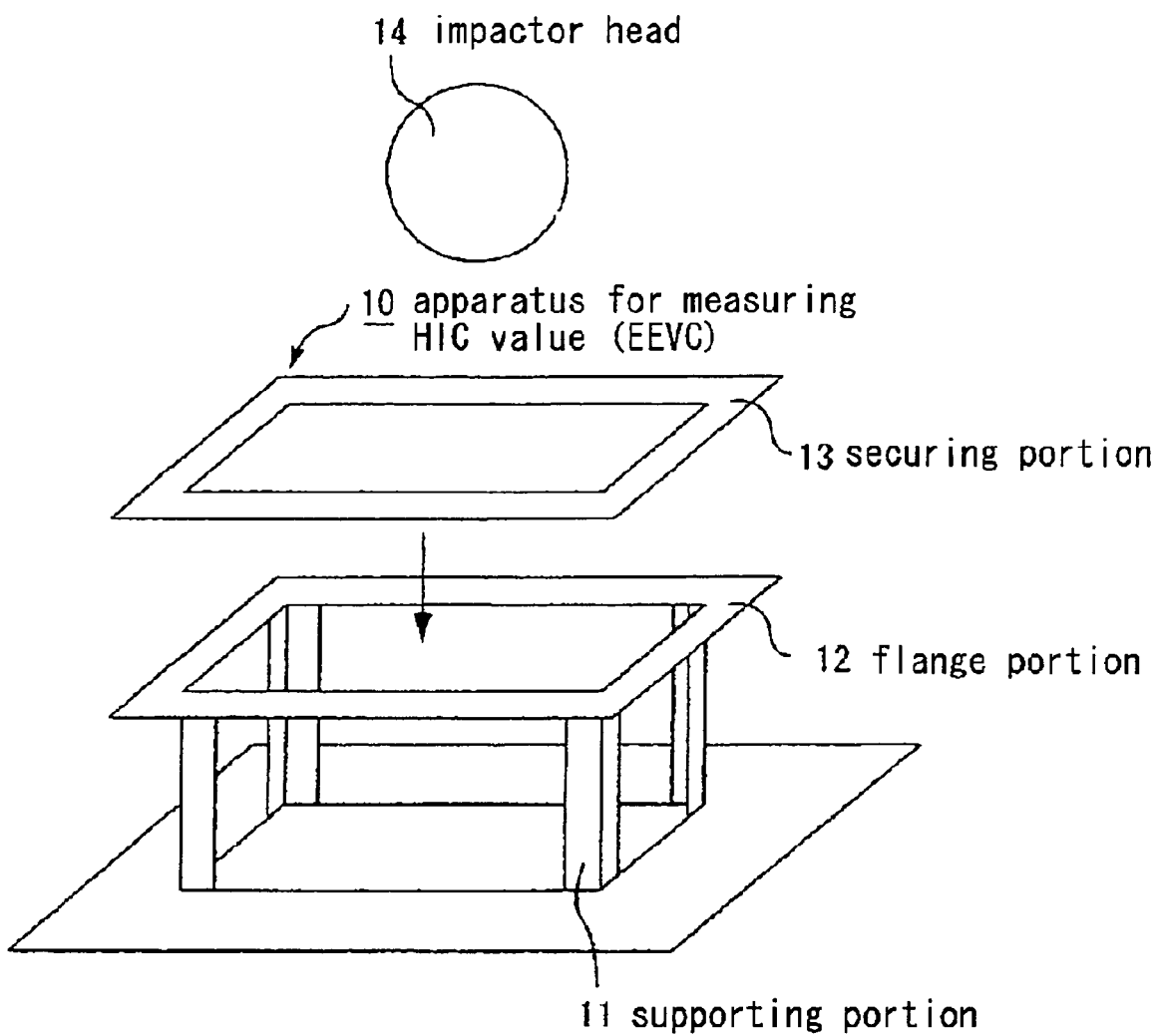
FIG. 1 is an exploded perspective view showing schematically a sample of an HIC measuring apparatus to measure HIC values (EEVC) of a laminated glass of the present invention.
Figure 2:
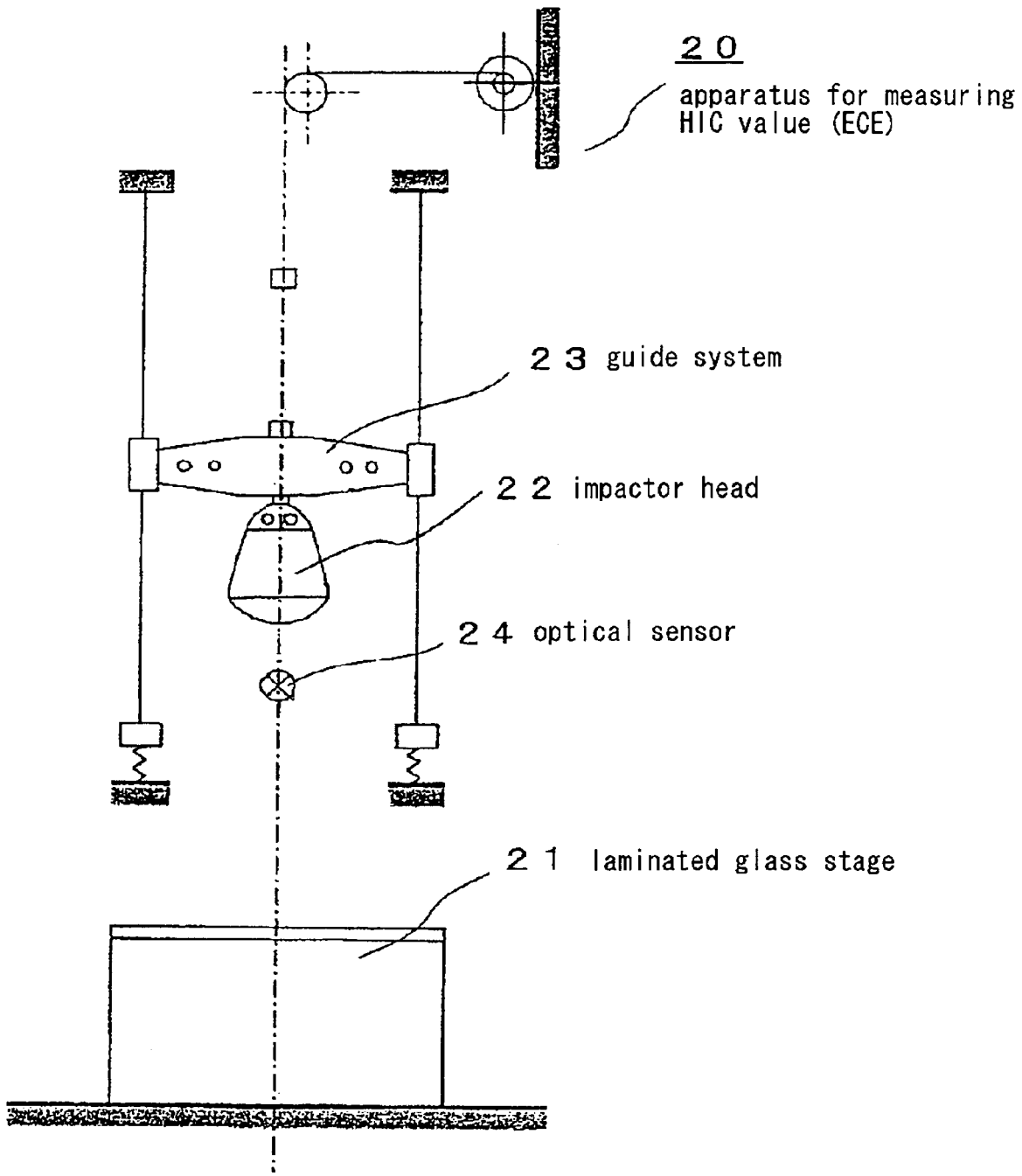
FIG. 2 is a schematic view showing a sample of an HIC measuring apparatus to measure HIC values (ECE) of the laminated glass of the present invention.
Figure 3:
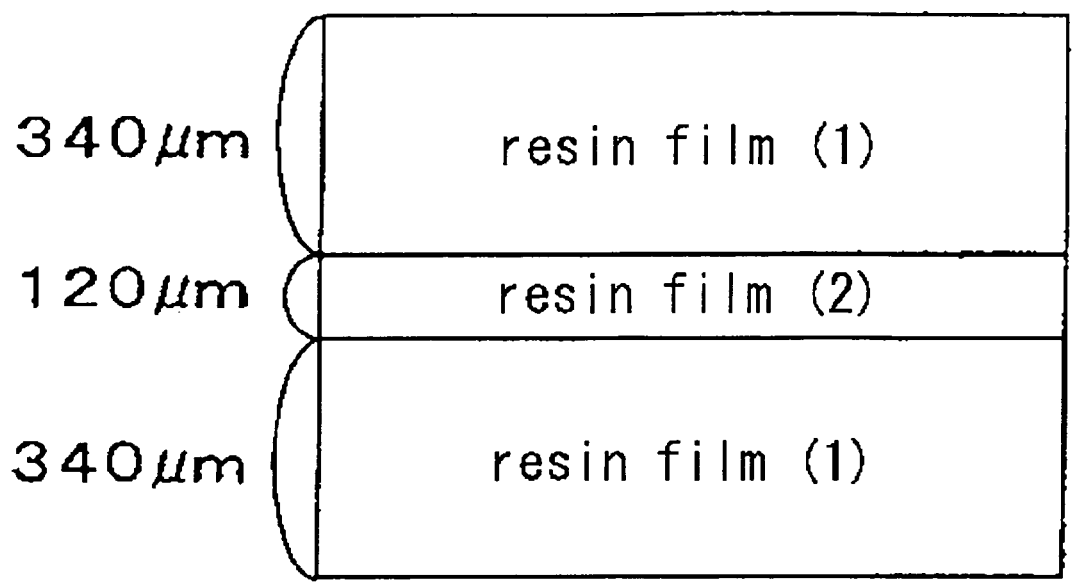
FIG. 3 is a schematic view showing a constitution of the interlayer film for laminated glasses obtained in Example 4.
Figure 4:
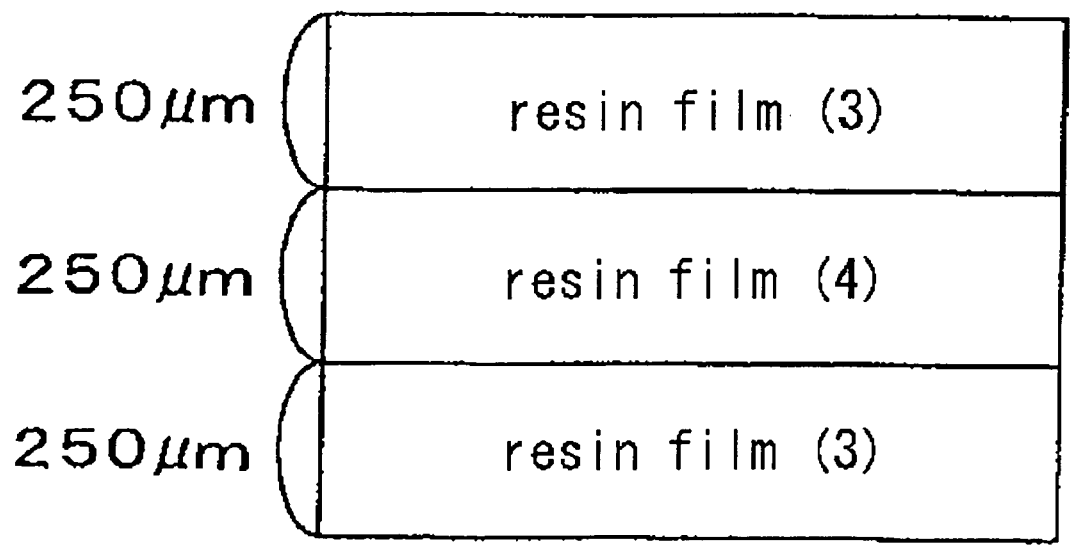
FIG. 4 is a schematic view showing a constitution of the interlayer film for laminated glasses obtained in Example 5.
Figure 5:
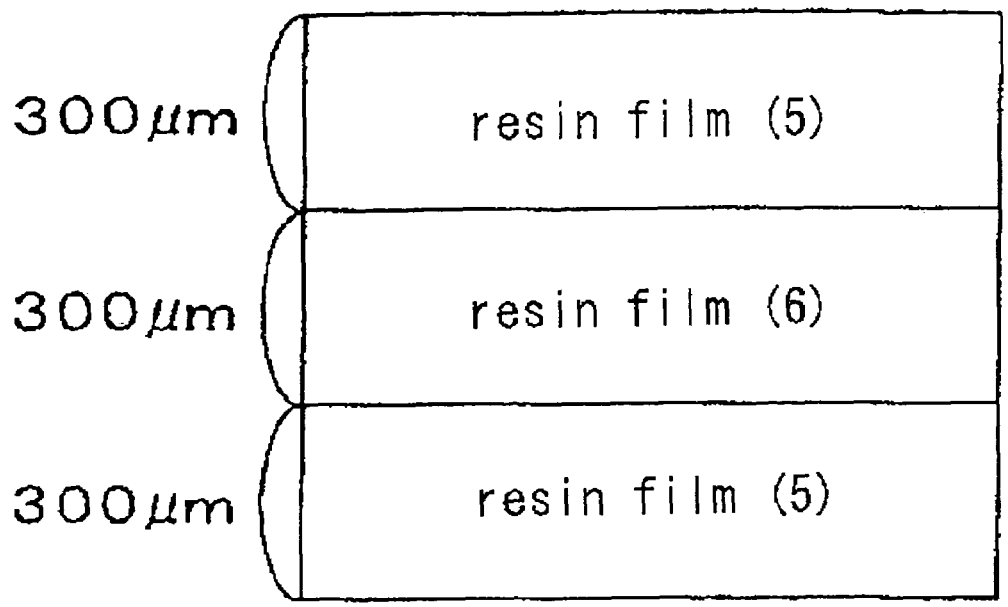
FIG. 5 is a schematic view showing a constitution of the interlayer film for laminated glasses obtained in Example 6.
Figure 6:
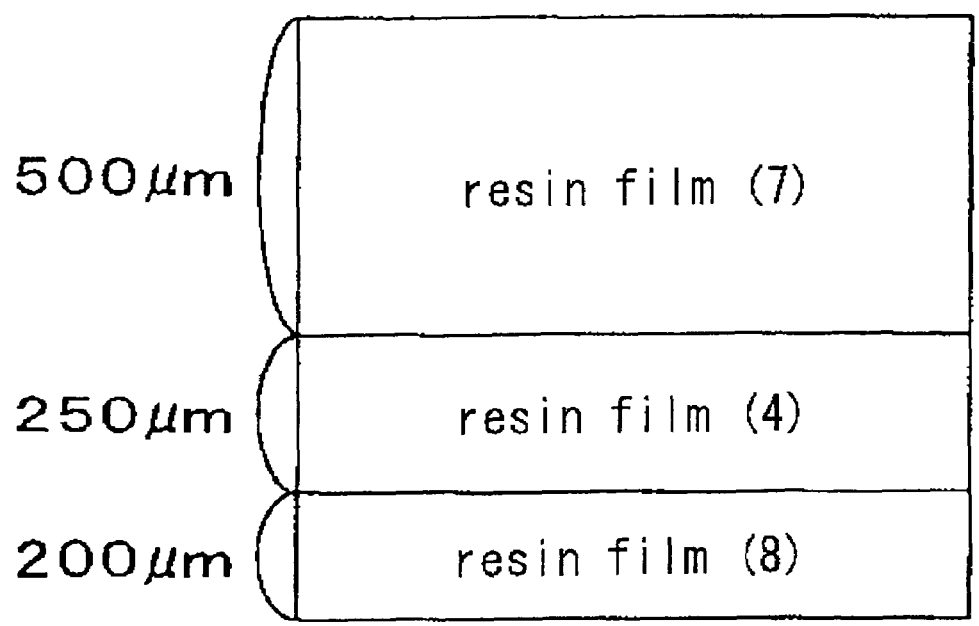
FIG. 6 is a schematic view showing a constitution of the interlayer film for laminated glasses obtained in Example 7.
Figure 7:
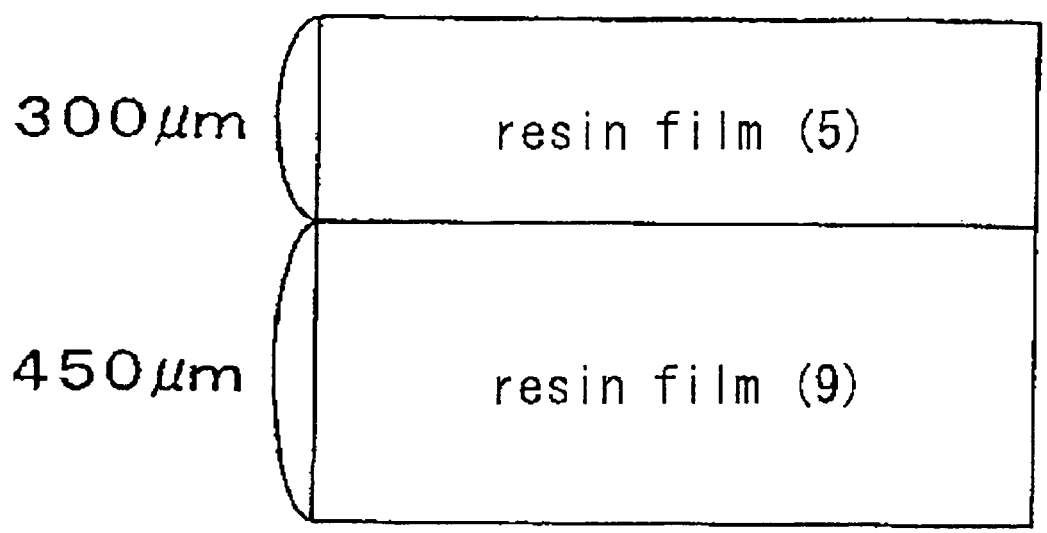
FIG. 7 is a schematic view showing a constitution of the interlayer film for laminated glasses obtained in Example 8.
Figure 8:
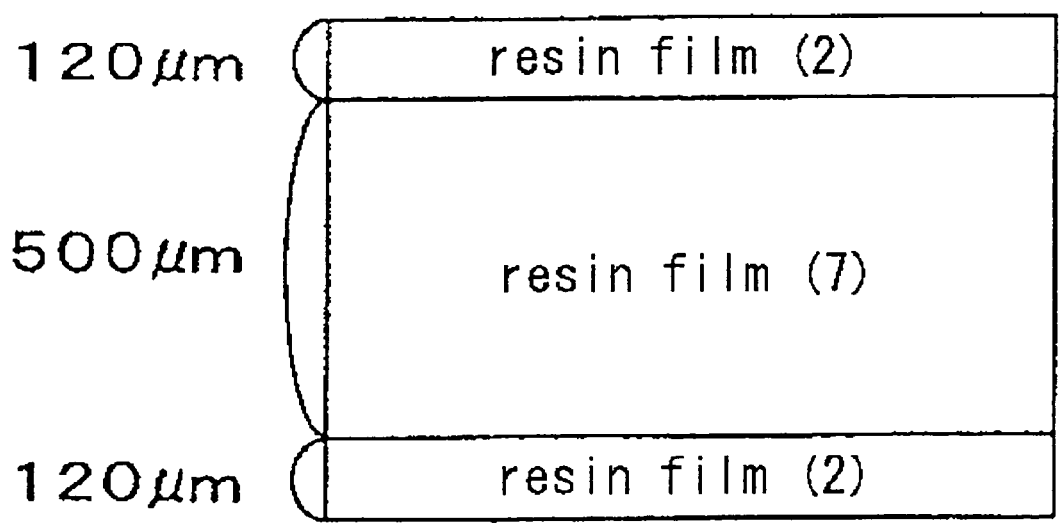
FIG. 8 is a schematic view showing a constitution of the interlayer film for laminated glasses obtained in Example 9.
Figure 9:
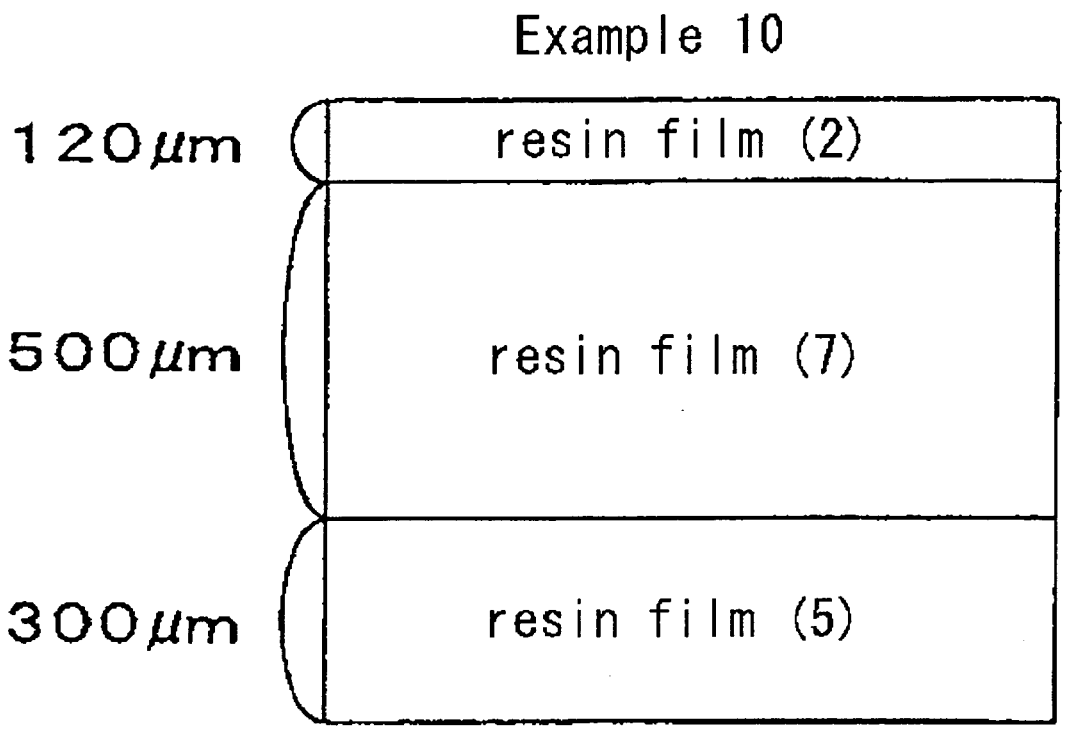
FIG. 9 is a schematic view showing a constitution of the interlayer film for laminated glasses obtained in Example 10.
Figure 10:
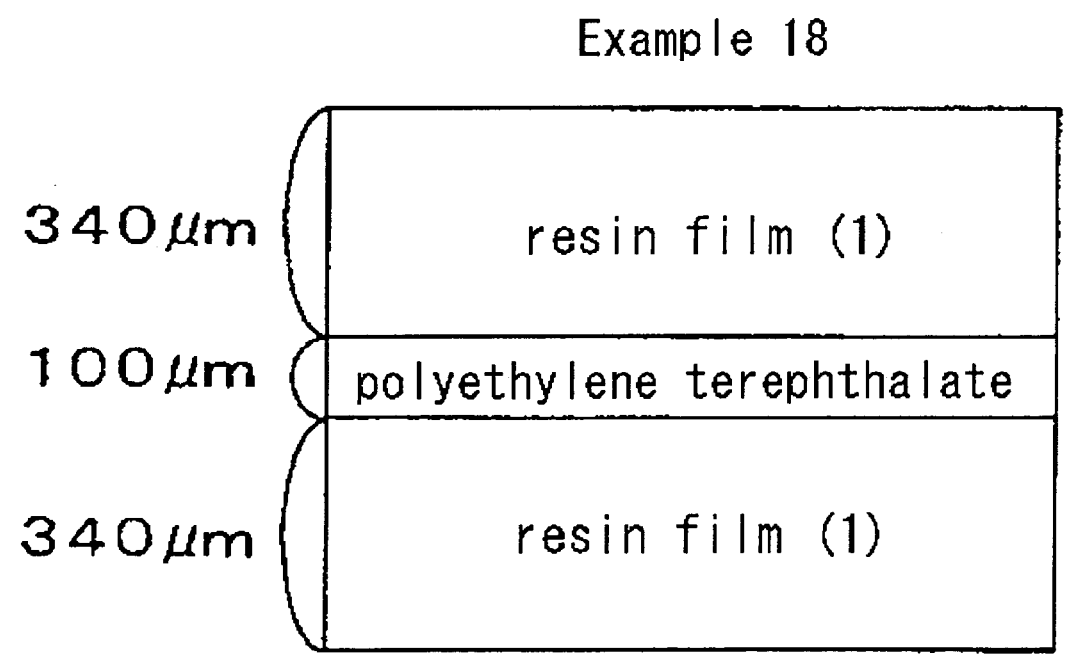
FIG. 10 is a schematic view showing a constitution of the interlayer film for laminated glasses obtained in Example 18.
Figure 11:
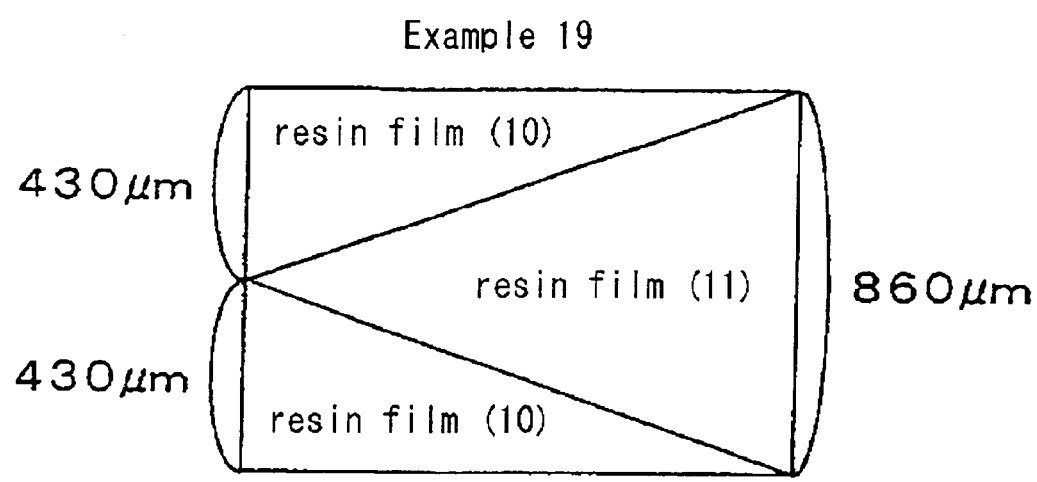
FIG. 11 is a schematic view showing a constitution of the interlayer film for laminated glasses obtained in Example 19.
Figure 12:
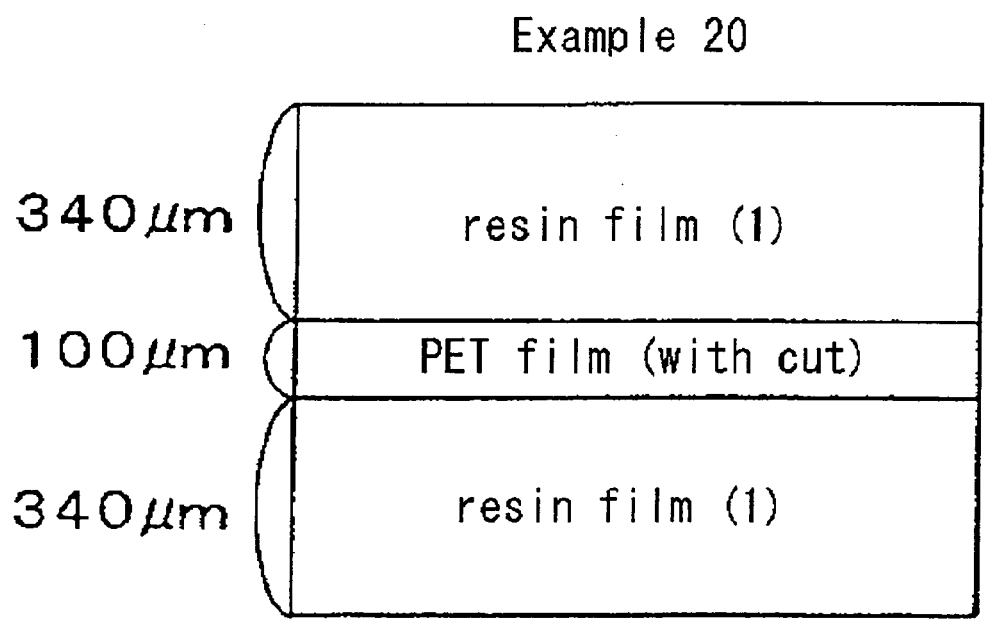
FIG. 12 is a schematic view showing a constitution of the interlayer film for laminated glasses obtained in Example 20.
Figure 13:
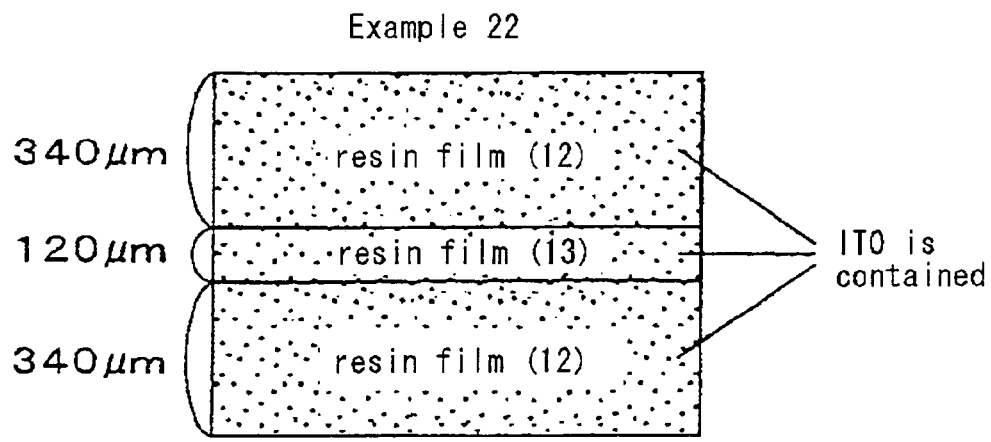
FIG. 13 is a schematic view showing a constitution of the interlayer film for laminated glasses obtained in Example 22.
Figure 14:
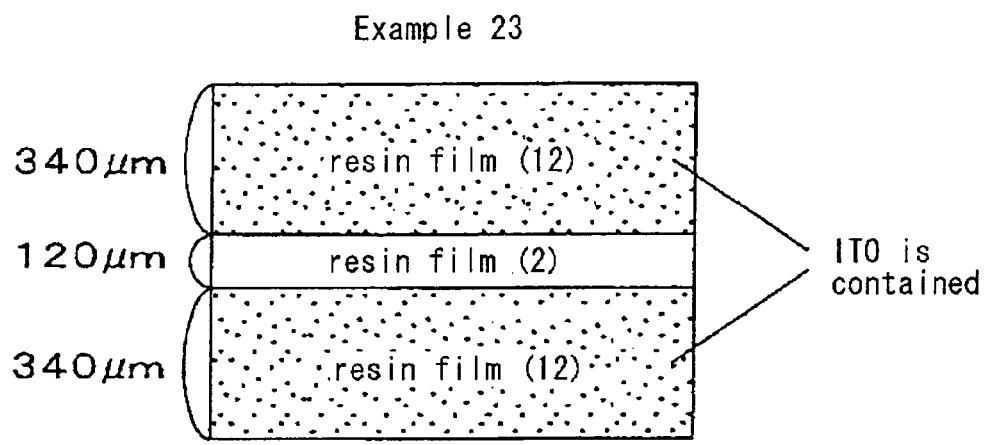
FIG. 14 is a schematic view showing a constitution of the interlayer film for laminated glasses obtained in Example 23.
Figure 15:
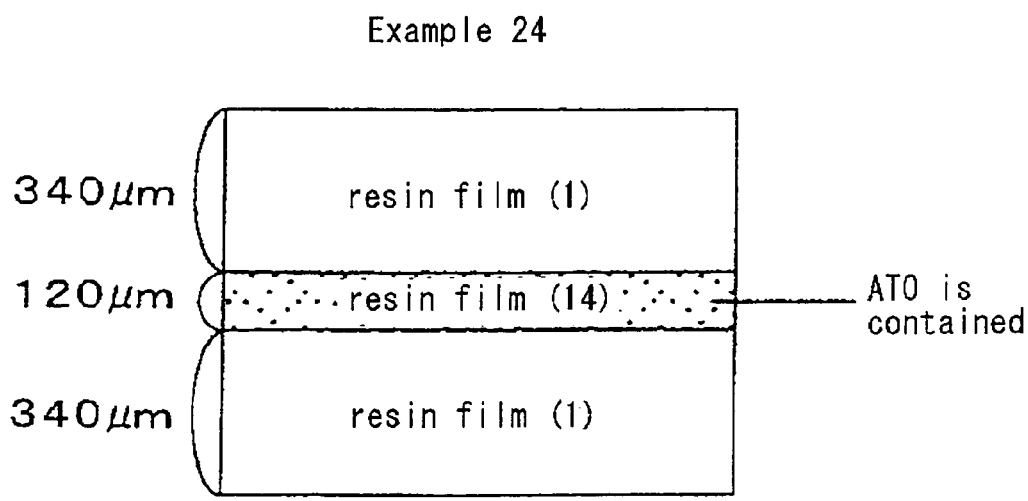
FIG. 15 is a schematic view showing a constitution of the interlayer film for laminated glasses obtained in Example 24.

10 apparatus for measuring HIC value (EEVC)
11 supporting portion 12 flange portion
13 securing portion
14 impactor head
20 apparatus for measuring HIC value (ECE)
21 laminated glass stage
22 impactor head
23 guide system
24 optical sensor

The invention claimed is:

1. A laminated glass,
wherein at least an interlayer film for laminated glasses and a glass sheet are laminated and unified, Head Injury Criteria (HIC) values, measured according to regulations of European Enhanced Vehicle-safety Committee; EEVC/WG17, being 1,000 or lower,
wherein the interlayer film for laminated glasses has a storage elasticity modulus G' in a linear dynamic viscoelasticity test, measured with frequencies being varied at 20° C. in a range of frequencies of $5.0 \times 10^1$ to $1.0 \times 10^2$ Hz, of $3 \times 10^7$ Pa or lower, and
wherein the interlayer film for laminated glasses comprises a crosslinked polyvinyl acetal resin having an acetalization degree of 60 to 85 mol % and contains a plasticizer for interlayer films in an amount 40 parts by weight or more per 100 parts by weight of the above-mentioned polyvinyl acetal resin.

2. The laminated glass according to claim 1,
wherein the interlayer film for laminated glasses has tan δ of at least one point of 0.6 or more at 20° C. in a range of frequencies of $5.0 \times 10^1$ to $1.0 \times 10^2$ Hz.

3. The laminated glass according to claim 1,
wherein the interlayer film for laminated glasses has maximum stress σ of 20 MPa or lower and fracture point deformation ε of 200% or more, derived from a stress-deformation curve at 20° C. and a tensile speed of 500%/min.

4. The laminated glass according to claim 3,
wherein the interlayer film for laminated glasses has breaking energy of 1.0 J/mm² or larger.

5. The laminated glass according to claim 1,
wherein the interlayer film for laminated glasses has a thickness of 800 μm or more.

6. The laminated glass according to claim 1,
wherein the interlayer film for laminated glasses comprises a polyvinyl acetal resin having a half band width of a peak of a hydroxyl group of 250 cm$^{-1}$ or lower in measuring infrared absorption spectra.

7. The laminated glass according to claim 1,
wherein rubber particles are dispersed in the interlayer film for laminated glasses.

8. The laminated glass according to claim 1,
wherein the interlayer film for laminated glasses has a multilayer structure.

9. The laminated glass according to claim 8,
wherein the interlayer film for laminated glasses has a two-layers structure and a storage elasticity modulus G' at 20° C. and a frequency of $5.0 \times 10^1$ to $1.0 \times 10^2$ Hz in one layer is at or below a half of a storage elasticity modulus G' at 20° C. and a frequency of $5.0 \times 10^1$ to $1.0 \times 10^2$ Hz in the other layer.

10. The laminated glass according to claim 9,
wherein the storage elasticity modulus G' at 20° C. and a frequency of $5.0 \times 10^1$ to $1.0 \times 10^2$ Hz in one layer is $2 \times 10^6$ Pa or lower and the storage elasticity modulus G' at 20° C. and a frequency of $5.0 \times 10^1$ to $1.0 \times 10^2$ Hz in the other layer is $1 \times 10^7$ Pa or higher.

11. The laminated glass according to claim 10,
wherein the layer having a storage elasticity modulus G' of $2 \times 10^6$ Pa or lower at 20° C. and a frequency of $5.0 \times 10^1$ to $1.0 \times 10^2$ Hz has tan δ of 0.7 or more at 20° C. and a frequency of $5.0 \times 10^1$ to $1.0 \times 10^2$ Hz.

12. The laminated glass according to claim 8,
wherein the interlayer film for laminated glasses has a three-layers structure and a storage elasticity modulus G' at 20° C. and a frequency of $5.0 \times 10^1$ to $1.0 \times 10^2$ Hz in an intermediate layer is at or below a half of a storage elasticity modulus G' at 20° C. and a frequency of $5.0 \times 10^1$ to $1.0 \times 10^2$ Hz in one or any of two layers composing the outermost layer.

13. The laminated glass according to claim 12,
wherein a storage elasticity modulus G' at 20° C. and a frequency of $5.0 \times 10^1$ to $1.0 \times 10^2$ Hz in the intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher.

14. The laminated glass according to claim 13,
wherein the intermediate layer has tan δ of 0.7 or more at 20° C. and a frequency of $5.0 \times 10^1$ to $1.0 \times 10^2$ Hz.

15. The laminated glass according to claim 13,
wherein the intermediate layer having a storage elasticity modulus G' of $2 \times 10^6$ Pa or lower at 20° C. and a frequency of $5.0 \times 10^1$ to $1.0 \times 10^2$ Hz is biased to the side of either surface layer with respect to the thickness direction of the interlayer film for laminated glasses.

16. The laminated glass according to claim 12,
wherein a thickness of the intermediate layer is 10% or higher of a total thickness of the interlayer film for laminated glasses.

17. The laminated glass according to claim 8,
wherein the interlayer film for laminated glasses has a three-layers structure and a storage elasticity modulus G' at 20° C. and a frequency of $5.0 \times 10^1$ to $1.0 \times 10^2$ Hz in one or any of two layers composing the outermost layer is at or below a half of a storage elasticity modulus G' at 20° C. and a frequency of $5.0 \times 10^1$ to $1.0 \times 10^2$ Hz in an intermediate layer.

18. The laminated glass according to claim 17,
wherein a storage elasticity modulus G' at 20° C. and a frequency of $5.0 \times 10^1$ to $1.0 \times 10^2$ Hz in one or any of two layers composing the outermost layer is $2 \times 10^6$ Pa or lower and a storage elasticity modulus G' at 20° C. and a frequency of $5.0 \times 10^1$ to $1.0 \times 10^2$ Hz in the intermediate layer is $1 \times 10^7$ Pa or higher.

19. The laminated glass according to claim 18,
wherein tan δ at 20° C. and a frequency of $5.0 \times 10^1$ to $1.0 \times 10^2$ Hz in one or any of two layers composing the outermost layer is 0.7 or more.

20. The laminated glass according to claim 18,
wherein the intermediate layer having the storage elasticity modulus G' of $1 \times 10^7$ Pa or higher at 20° C. and a frequency of $5.0 \times 10^1$ to $1.0 \times 10^2$ Hz is biased to the side of either surface layer with respect to the thickness direction of the interlayer film for laminated glasses.

21. The laminated glass according to claim 17,
wherein a total thickness of the outermost layer is 10% or higher of a total thickness of the interlayer film for laminated glasses.

22. The laminated glass according to claim 8,
wherein the interlayer film for laminated glasses has a multilayer structure of four-layers or more and a storage elasticity modulus G' at 20° C. and a frequency of $5.0 \times 10^1$ to $1.0 \times 10^2$ Hz in at least one layer of an intermediate layer is at or below a half of a storage elasticity modulus G' at 20° C. and a frequency of $5.0 \times 10^1$ to $1.0 \times 10^2$ Hz in one or any of two layers composing the outermost layer.

23. The laminated glass according to claim 22,
wherein a storage elasticity modulus G' at 20° C. and a frequency of $5.0 \times 10^1$ to $1.0 \times 10^2$ Hz in at least one layer of the intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher.

24. The laminated glass according to claim 23,
wherein the intermediate layer having a storage elasticity modulus G' of $5.0 \times 10^1$ to $1.0 \times 10^2$ Hz being $2 \times 10^6$ Pa or lower at 20° C. and a frequency has tan δ of 0.7 or more at 20° C. and a frequency of $5.0 \times 10^1$ to $1.0 \times 10^2$ Hz.

25. The laminated glass according to claim 23,
wherein a total thickness of the intermediate layer having a storage elasticity modulus G' of $2 \times 10^6$ Pa or lower at 20° C. and a frequency of $5.0 \times 10^1$ to $1.0 \times 10^2$ Hz is 10% or higher of a total thickness of the interlayer film for laminated glasses.

26. The laminated glass according to claim 8,
wherein the interlayer film for laminated glasses has a multilayer structure of four-layers or more and a storage elasticity modulus G' at 20° C. and a frequency of $5.0 \times 10^1$ to $1.0 \times 10^2$ Hz in one or any of two layers composing the outermost layer is at or below a half of a storage elasticity modulus G' at 20° C. and a frequency of $5.0 \times 10^1$ to $1.0 \times 10^2$ Hz in at least one layer of an intermediate layer.

27. The laminated glass according to claim 26,
wherein a storage elasticity modulus G' at 20° C. and a frequency of $5.0 \times 10^1$ to $1.0 \times 10^2$ Hz in one or any of two layers composing the outermost layer is $2 \times 10^6$ Pa or lower and a storage elasticity modulus G' at 20° C. and a frequency of $5.0 \times 10^1$ to $1.0 \times 10^2$ Hz in at least one layer of the intermediate layer is $1 \times 10^7$ Pa or higher.

28. The laminated glass according to claim 27,
wherein tan δ at 20° C. and a frequency of $5.0 \times 10^1$ to $1.0 \times 10^2$ Hz in one or any of two layers composing the outermost layer is 0.7 or more.

29. The laminated glass according to claim 26,
wherein a total thickness of the outermost layer is 10% or higher of a total thickness of the interlayer film for laminated glasses.

30. The laminated glass according to claim 8,
wherein the interlayer film for laminated glasses has a multilayer structure of three-layers or more and each layer has wedged form and the layer having wedged form is alternately overlaid with the layer of wedged form having a small storage elasticity modulus G' taken as an intermediate layer so that an overall thickness becomes uniform.

31. The laminated glass according to claim 1,
wherein the interlayer film for laminated glasses generates a break of 10 mm or longer in length in measuring a Head Injury Criteria (HIC) value.

32. The laminated glass according to claim 1,
wherein the interlayer film for laminated glasses has a sandwiched structure between glass sheets and a thickness of at least one glass sheet is 1.8 mm or smaller.

33. The laminated glass according to claim 1,
wherein the interlayer film for laminated glasses is sandwiched between a glass sheet and a transparent resin plate.

34. The laminated glass according to claim 33,
wherein the transparent resin plate comprises polycarbonate, acrylic resin, acrylic copolymerizable resin or polyester resin.

35. The laminated glass according to claim 33,
wherein the transparent resin plate is coated with transparent elastomer.

36. The laminated glass according to claim 1,
wherein electromagnetic wave shielding performance in frequencies of 0.1 to 26.5 GHz is 10 dB or less, haze is 1% or lower, visible transmittance is 70% or higher, and solar radiation transmittance in a wavelength region of 300 to 2,100 nm is 85% or lower of visible transmittance.

37. A laminated glass,
wherein at least an interlayer film for laminated glasses and a glass sheet are laminated and unified, Head Injury Criteria (HIC) values, measured by dropping an impactor head from a height of 4 m above the surface of the laminated glass according to regulations of Economic Commission for Europe; ECE-Regulation No. 43 Annex 3, being 300 or lower,
wherein the interlayer film for laminated glasses has a storage elasticity modulus G' in a linear dynamic viscoelasticity test, measured with frequencies being varied at 20° C. in a range of frequencies of $5.0 \times 10^1$ to $1.0 \times 10^2$ Hz, of $3 \times 10^7$ Pa or lower, and
wherein the interlayer film for laminated glasses comprises a crosslinked polyvinyl acetal resin having an acetalization degree of 60 to 85 mol % and contains a plasticizer for interlayer films in an amount 40 parts by weight or more per 100 parts by weight of the above-mentioned polyvinyl acetal resin.

38. The laminated glass according to claim 37,
wherein the interlayer film for laminated glasses has a thickness of 800 μm or more.

39. The laminated glass according to claim 37,
wherein the interlayer film for laminated glasses comprises a polyvinyl acetal resin having a half band width of a peak of a hydroxyl group of 250 $cm^{-1}$ or lower in measuring infrared absorption spectra.

40. The laminated glass according to claim 37,
wherein rubber particles are dispersed in the interlayer film for laminated glasses.

41. An interlayer film for laminated glasses,
which contains a plasticizer for interlayer films in an amount 40 parts by weight or more per 100 parts by weight of polyvinyl acetal resin,
a storage elasticity modulus G' in a linear dynamic viscoelasticity test, measured with frequencies being varied at 20° C. in a range of frequencies of $5.0 \times 10^1$ to $1.0 \times 10^2$ Hz, is $3 \times 10^7$ Pa or lower, and
which comprises a crosslinked polyvinyl acetal resin having an acetalization degree of 60 to 85 mol % and contains a plasticizer for interlayer films in an amount 40 parts by weight or more per 100 parts by weight of the above-mentioned polyvinyl acetal resin.

42. The interlayer film for laminated glasses according to claim 41,
wherein tan δ of at least one point is 0.6 or more at 20° C. in a range of frequencies of $5.0 \times 10^1$ to $1.0 \times 10^2$ Hz.

43. The interlayer film for laminated glasses according to claim 41,
wherein maximum stress σ is 20 MPa or smaller and fracture point deformation ε is 200% or more, derived from a stress-deformation curve at 20° C. and a tensile speed of 500%/min.

44. The interlayer film for laminated glasses according to claim 43,
   wherein breaking energy is 1.0 J/mm² or larger.

45. The interlayer film for laminated glasses according to claim 41,
   which has a thickness of 800 μm or more.

46. The interlayer film for laminated glasses according to claim 41,
   which comprises a polyvinyl acetal resin, a half band width of a peak of a hydroxyl group in measuring infrared absorption spectra being 250 cm⁻¹ or less.

47. The interlayer film for laminated glasses according to claim 41,
   wherein rubber particles are dispersed.

48. The interlayer film for laminated glasses according to claim 41,
   which has a multilayer structure.

49. The interlayer film for laminated glasses according to claim 48,
   which has a two-layers structure, a storage elasticity modulus G' at 20° C. and a frequency of $5.0 \times 10^1$ to $1.0 \times 10^2$ Hz in one layer being at or below a half of a storage elasticity modulus G' at 20° C. and a frequency of $5.0 \times 10^1$ to $1.0 \times 10^2$ Hz in the other layer.

50. The interlayer film for laminated glasses according to claim 49,
   wherein a storage elasticity modulus G' at 20° C. and a frequency of $5.0 \times 10^1$ to $1.0 \times 10^2$ Hz in one layer is $2 \times 10^6$ Pa or lower and a storage elasticity modulus G' at 20° C. and a frequency of $5.0 \times 10^1$ to $1.0 \times 10^2$ Hz in the other layer is $1 \times 10^7$ Pa or higher.

51. The interlayer film for laminated glasses according to claim 50,
   wherein the layer having a storage elasticity modulus G' of $5.0 \times 10^1$ to $1.0 \times 10^2$ Hz of $2 \times 10^6$ Pa or lower at 20° C. and a frequency has tan δ of 0.7 or more at 20° C. and a frequency of $5.0 \times 10^1$ to $1.0 \times 10^2$ Hz.

52. The interlayer film for laminated glasses according to claim 48,
   which has a three-layers structure, a storage elasticity modulus G' at 20° C. and a frequency of $5.0 \times 10^1$ to $1.0 \times 10^2$ Hz in an intermediate layer being at or below a half of a storage elasticity modulus G' at 20° C. and a frequency of $5.0 \times 10^1$ to $1.0 \times 10^2$ Hz in one or any of two layers composing the outermost layer.

53. The interlayer film for laminated glasses according to claim 52,
   wherein a storage elasticity modulus G' at 20° C. and a frequency of $5.0 \times 10^1$ to $1.0 \times 10^2$ Hz in the intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher.

54. The interlayer film for laminated glasses according to claim 53,
   wherein the intermediate layer has tan δ of 0.7 or more at 20° C. and a frequency of $5.0 \times 10^1$ to $1.0 \times 10^2$ Hz.

55. The interlayer film for laminated glasses according to claim 53,
   wherein the intermediate layer having the storage elasticity modulus G' of $2 \times 10^6$ Pa or lower at 20° C. and a frequency of $5.0 \times 10^1$ to $1.0 \times 10^2$ Hz is biased to the side of either surface layer with respect to the thickness direction of the interlayer film for laminated glasses.

56. The interlayer film for laminated glasses according to claim 52,
   wherein a thickness of the intermediate layer is 10% or higher of a total thickness of the interlayer film for laminated glasses.

57. The interlayer film for laminated glasses according to claim 48,
   which has a three-layers structure, a storage elasticity modulus G' at 20° C. and a frequency of $5.0 \times 10^1$ to $1.0 \times 10^2$ Hz in one or any of two layers composing the outermost layer being at or below a half of a storage elasticity modulus G' at 20° C. and a frequency of $5.0 \times 10^1$ to $1.0 \times 10^2$ Hz in an intermediate layer.

58. The interlayer film for laminated glasses according to claim 57,
   wherein a storage elasticity modulus G' at 20° C. and a frequency of $5.0 \times 10^1$ to $1.0 \times 10^2$ Hz in one or any of two layers composing the outermost layer is $2 \times 10^6$ Pa or lower and a storage elasticity modulus G' at 20° C. and a frequency of $5.0 \times 10^1$ to $1.0 \times 10^2$ Hz in the intermediate layer is $1 \times 10^7$ Pa or higher.

59. The interlayer film for laminated glasses according to claim 58,
   wherein tan δ at 20° C. and a frequency of $5.0 \times 10^1$ to $1.0 \times 10^2$ Hz in one or any of two layers composing the outermost layer is 0.7 or more.

60. The interlayer film for laminated glasses according to claim 58,
   wherein the intermediate layer having the storage elasticity modulus G' of $1 \times 10^7$ Pa or higher at 20° C. and a frequency of $5.0 \times 10^1$ to $1.0 \times 10^2$ Hz is biased to the side of either surface layer with respect to the thickness direction of the interlayer film for laminated glasses.

61. The interlayer film for laminated glasses according to claim 57,
   wherein a total thickness of the outermost layer is 10% or higher of a total thickness of the interlayer film for laminated glasses.

62. The interlayer film for laminated glasses according to claim 48,
   which has a multilayer structure of four-layers or more, a storage elasticity modulus G' at 20° C. and a frequency of $5.0 \times 10^1$ to $1.0 \times 10^2$ Hz in at least one layer of an intermediate layer being at or below a half of a storage elasticity modulus G' at 20° C. and a frequency of $5.0 \times 10^1$ to $1.0 \times 10^2$ Hz in one or any of two layers composing the outermost layer.

63. The interlayer film for laminated glasses according to claim 62,
   wherein a storage elasticity modulus G' at 20° C. and a frequency of $5.0 \times 10^1$ to $1.0 \times 10^2$ Hz in at least one layer of the intermediate layer is $2 \times 10^6$ Pa or lower and a storage elasticity modulus G' at 20° C. and a frequency of $5.0 \times 10^1$ to $1.0 \times 10^2$ Hz in one or any of two layers composing the outermost layer is $1 \times 10^7$ Pa or higher.

64. The interlayer film for laminated glasses according to claim 63,
   wherein the intermediate layer having a storage elasticity modulus G' of $2 \times 10^6$ Pa or lower at 20° C. and a frequency of $5.0 \times 10^1$ to $1.0 \times 10^2$ Hz has tan δ of 0.7 or more at 20° C. and a frequency of $5.0 \times 10^1$ to $1.0 \times 10^2$ Hz.

65. The interlayer film for laminated glasses according to claim 63,
   wherein a total thickness of the intermediate layer having a storage elasticity modulus G' of $2 \times 10^6$ Pa or lower at 20° C. and a frequency of $5.0 \times 10^1$ to $1.0 \times 10^2$ Hz is 10% or higher of a total thickness of the interlayer film for laminated glasses.

66. The interlayer film for laminated glasses according to claim 48,
   which has a multilayer structure of four-layers or more, a storage elasticity modulus G' at 20° C. and a frequency of $5.0 \times 10^1$ to $1.0 \times 10^2$ Hz in one or any of two layers composing the outermost layer being at or below a half of a storage elasticity modulus G' at 20° C. and a frequency of $5.0 \times 10^1$ to $1.0 \times 10^2$ Hz in at least one layer of an intermediate layer.

67. The interlayer film for laminated glasses according to claim 66,
   wherein a storage elasticity modulus G' at 20° C. and a frequency of $5.0 \times 10^1$ to $1.0 \times 10^2$ Hz in one or any of two layers composing the outermost layer is $2 \times 10^6$ Pa or lower and a storage elasticity modulus G' at 20° C. and a frequency of $5.0 \times 10^1$ to $1.0 \times 10^2$ Hz in at least one layer of the intermediate layer is $1 \times 10^7$ Pa or higher.

68. The interlayer film for laminated glasses according to claim 67,
   wherein tan δ at 20° C. and a frequency of $5.0 \times 10^1$ to $1.0 \times 10^2$ Hz in one or any of two layers composing the outermost layer is 0.7 or more.

69. The interlayer film for laminated glasses according to claim 66,
   wherein a total thickness of the outermost layer is 10% or higher of a total thickness of the interlayer film for laminated glasses.

70. The interlayer film for laminated glasses according to claim 48,
   which has a multilayer structure of three-layers or more, each layer having wedged form and the layer having wedged form being alternately overlaid with the layer of wedged having a small storage elasticity modulus G' taken as an intermediate layer so that an overall thickness becomes uniform.

71. The interlayer film for laminated glasses according to claim 48,
   wherein polyvinyl acetal resin of at least one layer contains metal oxide particles having a function of screening out heat rays.

72. The interlayer film for laminated glasses according to claim 41, wherein polyvinyl acetal resin contains metal oxide particles having a function of screening out heat rays.

73. The interlayer film for laminated glasses according to claim 72, wherein the particle of metal oxide is tin-doped indium oxide and/or antimony-doped tin oxide, and the above-mentioned tin-doped indium oxide and/or the above-mentioned antimony-doped tin oxide has an average diameter of secondary particles formed by flocculation of 80 nm or smaller and is dispersed in polyvinyl acetal resin in such a way that a secondary particle formed by flocculation of 100 nm or larger in diameter has a density of 1 particle/μm² or less in polyvinyl acetal resin.

\* \* \* \* \*